US010685383B2

(12) United States Patent
Soni et al.

(10) Patent No.: US 10,685,383 B2
(45) Date of Patent: Jun. 16, 2020

(54) PERSONALIZING EXPERIENCES FOR VISITORS TO REAL-WORLD VENUES

(71) Applicant: Adobe Inc., San Jose, CA (US)

(72) Inventors: Sachin Soni, New Dehli (IN); Kevin Gary Smith, Lehi, UT (US); Ashish Duggal, Delhi (IN); Anmol Dhawan, Ghaziabad (IN)

(73) Assignee: Adobe Inc., San Jose, CA (US)

(*) Notice: Subject to any disclaimer, the term of this patent is extended or adjusted under 35 U.S.C. 154(b) by 853 days.

(21) Appl. No.: 15/017,066

(22) Filed: Feb. 5, 2016

(65) Prior Publication Data

US 2017/0228804 A1 Aug. 10, 2017

(51) Int. Cl.
*G06Q 30/00* (2012.01)
*G06Q 30/06* (2012.01)
*H04B 5/00* (2006.01)
*H04L 29/08* (2006.01)

(52) U.S. Cl.
CPC ..... *G06Q 30/0601* (2013.01); *G06Q 30/0641* (2013.01); *H04B 5/0031* (2013.01); *H04L 67/18* (2013.01); *H04L 67/22* (2013.01); *H04L 67/306* (2013.01)

(58) Field of Classification Search
None
See application file for complete search history.

(56) References Cited

U.S. PATENT DOCUMENTS

| 8,838,463 B2* | 9/2014 | Fernandez | G06Q 30/02 705/2 |
|---|---|---|---|
| 2008/0281694 A1* | 11/2008 | Kretz | G06Q 30/02 705/14.64 |
| 2013/0290108 A1* | 10/2013 | Machado | G06Q 30/02 705/14.66 |
| 2014/0113674 A1* | 4/2014 | Joseph | H04W 4/021 455/519 |

(Continued)

OTHER PUBLICATIONS

Zheng Qin, "Introduction to E-commerce", 2009, Springer, springer.com (Year: 2009).*

(Continued)

*Primary Examiner* — Naeem U Haq
*Assistant Examiner* — Norman Donald Sutch, Jr.
(74) *Attorney, Agent, or Firm* — Kilpatrick Townsend & Stockton LLP

(57) ABSTRACT

Methods select content to be delivered to a visitor to a real-world venue. One method identifies a visitor to a real-world venue based on tracked physical actions and a profile including previously collected visitor information associated with the venue. The method determines that members of a group are present at the venue with the visitor, where the determining is based at least in part on the previously collected visitor information. Based on determining that the visitor is at the venue with members of the group, content is selected for the visitor. Another method identifies a visitor to a venue as belonging to a group by identifying the visitor based on tracked physical actions and collected visitor information. The tracked actions and visitor (Continued)

information are used to determine whether the visitor is in the venue with members of the group. Tailored content is sent to the visitor based on the determination.

20 Claims, 10 Drawing Sheets

(56) References Cited

U.S. PATENT DOCUMENTS

| | | | | |
|---|---|---|---|---|
| 2015/0264131 | A1* | 9/2015 | Goldstein | G06F 3/165 |
| | | | | 709/223 |
| 2015/0278888 | A1* | 10/2015 | Lu | G06Q 30/0601 |
| | | | | 705/14.64 |
| 2016/0148219 | A1* | 5/2016 | Chauhan | G06Q 30/0201 |
| | | | | 705/7.29 |
| 2016/0210682 | A1* | 7/2016 | Kannan | G06Q 30/0261 |
| 2016/0242010 | A1* | 8/2016 | Parulski | H04W 4/04 |
| 2017/0090840 | A1* | 3/2017 | Hardikar | G06F 3/1226 |
| 2017/0109723 | A1* | 4/2017 | Woo | H04B 17/318 |

OTHER PUBLICATIONS

Nitin Jain, "Internet of Things (IoT)—Top 3 Industries waiting to be Disrupted", Mar. 25, 2015(https://www.linkedin.com/pulse/internet-things-iot-top-3-industries-waiting-disrupted-nitin-jain) (Year: 2015).*
Claudio Bettini, Daniele Riboni; "Privacy protection in pervasive systems: State of the art and technical challenges"; 2014; Elsevier; Pervasive and Mobile Computing 17 (2015) 159-174; p. 166 (Year: 2014).*

* cited by examiner

400 Personalized Content
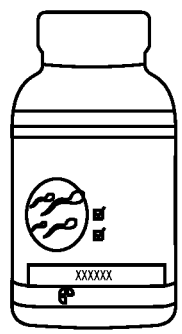
MOTILITY BOOST FOR MEN
RATING: ★★★☆☆
$~~$23.98~~ | 3% OFF
$ 23.20
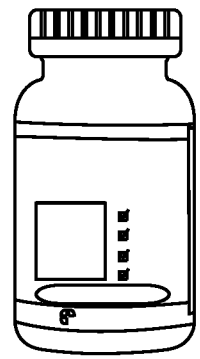
FERTILAID FOR WOMEN
RATING: ★★★★★
$~~$33.18~~ | 9% OFF
$ 30.15
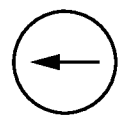 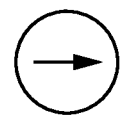
FIG. 4

| VISITOR ANALYTICS PARAMETERS CONNECTION GRAPHING AND CONFIDENCE EVALUATION | | |
|---|---|---|
| PARAMETER | NAME | DESCRIPTION |
| $\delta t_{in}$ | THRESHOLD TIME DIFFERENCE FOR VENUE ENTRY | IF TWO VISITORS ENTER A VENUE AT TIMES THAT ARE SEPARATED BY $\delta t_{in}$ OR MORE, THEY ARE NOT WITHIN EACH OTHER'S CIRCLE OF CONNECTION |
| $\delta t_{out}$ | THRESHOLD TIME DIFFERENCE FOR VENUE EXIT | IF TWO VISITORS EXIT A VENUE AT TIMES THAT ARE SEPARATED BY $\delta t_{out}$ OR MORE, THEY ARE NOT WITHIN EACH OTHER'S CIRCLE OF CONNECTION |
| $N_1$ | NUMBER OF SAME-DAY VISITS | NUMBER OF TIMES THAT A GIVEN OF VISITORS VISITED THE SAME VENUE ON THE SAME DAY |
| $N_{1t}$ | NUMBER OF SAME-DAY TIME-SYNCED VISITS | OF THE $N_1$ SAME-DAY VISITS, NUMBER OF VISITS THAT HAVE ENTRY AND EXIT TIMES WITHIN THE $\delta t_{in}$ AND $\delta t_{out}$ THRESHOLDS, RESPECTIVELY |
| $T_1$ | THRESHOLD PROPORTION OF TIME-SYNCED VISITS | IF $(N_{1t}/N_1) \leq T1$ FOR A GIVEN PAIR OF VISITORS, THEY ARE NOT WITHIN EACH OTHER'S CIRCLE OF CONNECTION |
| $\delta d$ | THRESHOLD GEOLOCATION DIFFERENCE | IF TWO GEOLOCATION DATA SAMPLES ARE WITHIN DISTANCE $\delta d$, THEY ARE CONSIDERED TO BE TOGETHER |
| $N_2$ | NUMBER OF GEOLOCATION DATA SAMPLES | FOR A GIVEN PAIR OF VISITORS CONNECTED WITH HIGH CONFIDENCE, NUMBER OF GEOLOCATION DATA SAMPLES THAT ARE CONSIDERED |
| $N_{2d}$ | NUMBER OF GEOLOCATION DATA SAMPLES WITHIN $\delta d$ | OF THE $N_2$ GEOLOCATION DATA SAMPLES, NUMBER OF SAMPLES THAT ARE WITHIN THE $\delta d$ THRESHOLD |
| $T_2$ | THRESHOLD PROPORTION OF GEOLOCATION SAMPLES | IF $(N_{2d}/N_2) \leq T_2$ FOR A GIVEN PAIR OF VISITORS, THE CONFIDENCE IN THEIR CONNECTION DOES NOT EXCEED HIGH |
| $T_3$ | THRESHOLD TIME FOR ULTRA HIGH CONFIDENCE LINK | IF TWO VISITORS CONNECTED WITH *HIGH* OR *SUPER HIGH* CONFIDENCE ARE TOGETHER IN VENUE FOR A DURATION GREATER THAN $T_3$, THE CONFIDENCE IN THEIR CONNECTION IS ULTRA HIGH |

FIG. 10

PERSONALIZING EXPERIENCES FOR VISITORS TO REAL-WORLD VENUES

TECHNICAL FIELD

The present disclosure generally relates to tailoring content for visitors to real-world venues, and more specifically to techniques for observing visitor behaviors and interactions at a real-word venue, and using such observations to personalize experiences for the visitor.

BACKGROUND

In contrast to online shopping environments, brick-and-mortar stores and other real-world shopping venues lack means to readily determine that customers are visiting a location with a group such as family members or friends. As a result, real-world shopping venues are unable to personalize shopping experiences and tailor content for visitors based on who the visitors are shopping with in the venue. Efficient tailoring of content for such visitors can increase visitor responsiveness to products presented to the visitors while the visitors are in the real-world venue (e.g., while the visitor is shopping in a store with family members). Hence, tailoring content for visitors is very important to marketers and venue operators.

Shopping is often a family activity. However, stores are often unable to provide a family-friendly or couple-friendly shopping experience because retailers lack sufficient information to enhance the experience for couples and families visiting their stores. For example, a visitor to a store may only go to the store's home appliance section when the visitor is shopping in the store with his family members. It is desirable to personalize content sent to mobile device of such a visitor in order to promote home appliances while the visitor is in the store with his family. However, existing techniques cannot determine that the visitor is in the store with his family. Hence, determining who a visitor is shopping with in a store is important to retailers.

In a real-world shopping venue, such as a brick-and-mortar store, a person's behavior can be different when he is shopping alone compared to when he is shopping in the venue with a group such as family members, friends, or colleagues. Visitors, patrons, customers, shoppers, guests, and other visitors to a real-world venue may behave differently based on the company they are with at the venue. For example, a visitor who has a health ailment may only buy medicine from a drugstore or pharmacy when he is shopping alone. Also, for example, if a visitor goes to a venue such as a restaurant with a financially conservative co-worker, the visitor may order conservatively, whereas when the visitor goes to a restaurant with his spouse, the visitor may spend more lavishly. Similarly, a visitor may order non-vegetarian meals when he is at a restaurant with his co-workers, but may order vegetarian meals when he is with a parent.

While marketers often devote significant resources to analyzing a visitor's online activities and creating a detailed digital marketing profile for website visitors based on such analysis, less attention has been devoted to analyzing activities of people present in real-world venues such as visitors to brick-and-mortar stores. One reason for this is the fact that the visitor's offline activities often do not involve direct interaction with a computer system, thus making such activities more difficult to observe, track, record, and analyze. Mobile computing devices, such as smartphones, may provide some insight into a website visitor's location while conducting certain online activities, but even this information is limited to interactions between the visitor and the smartphone. Such information generally does not, for example, accurately reflect offline interactions such as a family visit to a store in order to shop together. A visitor profile that fails to adequately represent the visitor's offline activities will not be as accurate as a more comprehensive profile, and therefore will not allow a marketer to tailor content for the visitor as effectively. Furthermore, a visitor profile that is based only on online activities will be less valuable to a marketer who wishes to target the visitor in an offline context, for example, as the visitor shops in a retail outlet. Existing digital marketing profiles therefore omit substantial, and potentially valuable, portions of a visitor's activity. This is especially problematic given that retail sales still overwhelmingly occur offline, and further given that offline activities often significantly influence online purchase decisions. This prevents marketers from effectively targeting visitors in both online and offline environments.

Existing techniques and platforms for audience management are not equipped to personalize experiences for visitors to a venue based on their current company in the venue. Thus, there is a need for systems that tailor content for a visitor based on who that visitor is currently with in order to take advantage of the fact that the visitor's behavior is different when he is alone compared to when he is with family members, friends, or colleagues.

SUMMARY

Systems and methods are disclosed for tailoring content to be delivered to a visitor to a real-world venue such as a brick-and-mortar store, a home, a restaurant, a motor vehicle, or a live performance venue (e.g., a music or sports venue). Embodiments identify a visitor to a real-world venue based at least in part on tracked physical actions and a profile including previously collected visitor information associated with the real-world venue. In some embodiments, one or more members of a group of visitors present at the real-world venue with the visitor are also identified. These embodiments determine whether the visitor is a member of the group. The determination is based at least in part on the previously collected visitor information. Based on determining that the visitor is a member of the group, certain embodiments select content to be presented to the visitor while the visitor is at the venue with members of the group.

One disclosed method selects content to be delivered to a visitor to a real-world venue. The method identifies the visitor based at least in part on tracked physical actions and a profile including previously collected visitor information associated with the real-world venue. The method then determines that one or more members of a group associated with the identified visitor are present at the real-world venue with the identified visitor, where the determination is based at least in part on the previously collected visitor information. Based on determining that the visitor is present at the real-world venue with one or more members of the group, the method selects content for the identified visitor while the visitor is present at the real-world venue.

An example embodiment uses an audience management platform, such as, for instance, Adobe® Audience Manager to properly place a visitor to a venue in a user segment based on who the visitor is currently with (i.e., others who are accompanying the visitor, the visitor's companion(s)). Embodiments target content, such as, for example marketing content, to a person based on who is with that person. Content can be tailored for the person based on identifying a group that the person is currently with while the person is visiting a real-world venue. In certain embodiments, the real-world venue can be any physical location where Internet of things (IoT) devices can be used to identify who, if anyone, is accompanying the person at the real-world venue. For example, the real-world venue can be a room in the person's home, the person's car, or a real-world shopping venue such as a brick-and-mortar store that the person is visiting. For instance, embodiments can personalize commercials in previously recorded video content based on determining that the person is currently viewing the video content with one or more friends in the person's living room. Similarly, embodiments can use data collected by IoT sensors and monitors in the person's car to present offers to the person based on where the car is and who is in the car with the person. In one example of such embodiments, a passenger in a car can be shown different ads based on whether the passenger is with a spouse, a parent, a co-worker, or a friend.

Systems and methods are disclosed for identifying visitors to a real-world venue as being with a group, and personalizing visitor experiences based on who is in the group. Embodiments relate to computer-implemented methods and systems for using IoT devices to determine if a visitor to a real-world venue is with a group, and to personalize the visitor's experience based on who is in the group. Example techniques use IoT devices to personalize experiences for visitors to a real-world shopping venue such as a store based on who they are shopping with in the venue. This involves tracking physical actions of a visitor present at the real-world shopping venue and identifying the visitor as being in the venue with a group based on the tracked physical actions and previously collected visitor information associated with the venue. The visitor is determined to be visiting the venue with a group based on the tracked actions and the previously collected visitor information. The user experience for the visitor is personalized based on determining that the visitor is visiting the venue with the group. This is accomplished by tailoring content presented to the visitor while the visitor is present at the real-world shopping venue with the group.

Another embodiment determines that a visitor who routinely visits a real-world venue together with others belongs to a group, and tailors content for the visitor based on their previous activities while visiting the real-world shopping with the group. The visitor and members of the group carry mobile devices connected to a communication network. This embodiment allows personalized content to be presented to the visitor while the visitor is present at the real-world venue with the group. The personalized content can be rendered on an interface that is presented on in-store interactive display screens at the real-world venue or via an interface of an application installed on the visitor's mobile device.

These illustrative features are mentioned not to limit or define the disclosure, but to provide examples to aid understanding thereof. Additional embodiments are discussed in the Detailed Description, and further description is provided there. Advantages offered by one or more of the various embodiments may be further understood by examining this specification or by practicing one or more embodiments presented.

BRIEF DESCRIPTION OF THE FIGURES

These and other features, aspects, and advantages of the present disclosure are better understood when the following Detailed Description is read with reference to the accompanying drawings, where:

FIG. 4 depicts personalized content that can be presented to a visitor to a real-world shopping venue, in accordance with embodiments;

FIG. 10 depicts a table listing visitor analytics parameters used in certain implementations of the group identification methods disclosed herein, in accordance with embodiments.

DETAILED DESCRIPTION

Figure 1:
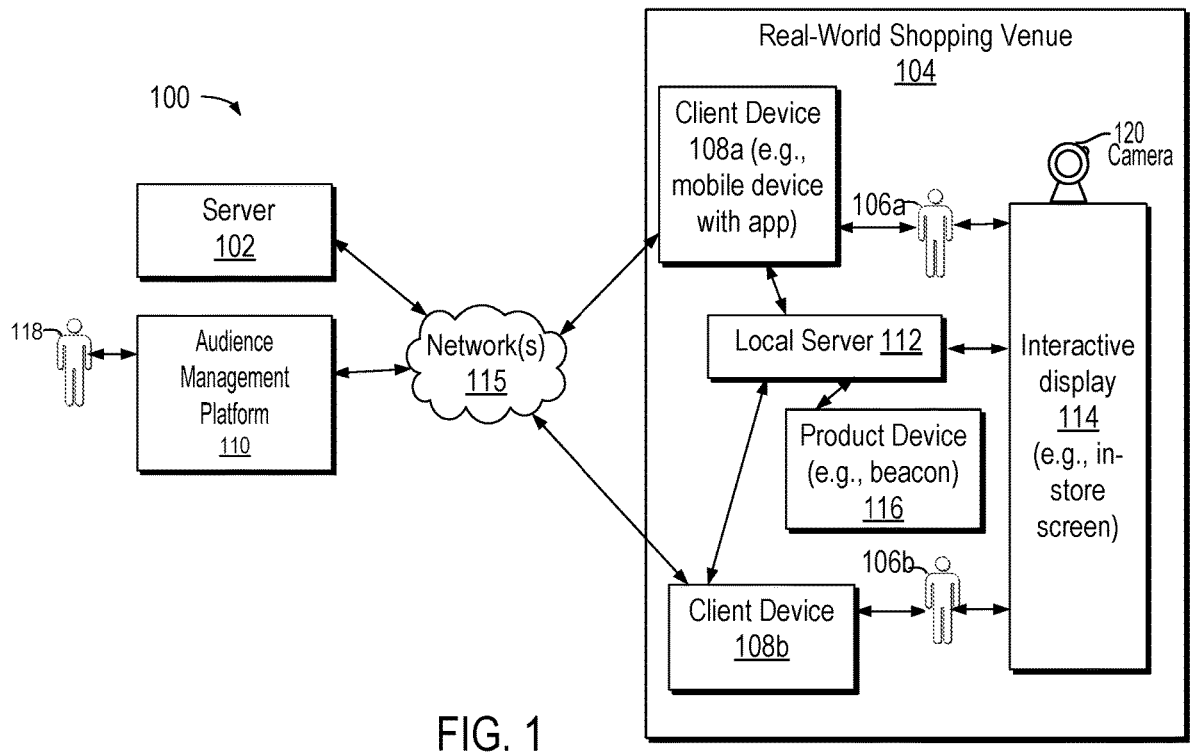
FIG. 1 is a block diagram of a system for identifying visitors shopping at real-world shopping venues while carrying or interacting with electronic devices, in accordance with embodiments.

Embodiments focus on how a visitor's behavior changes depending on whom they are with or whether they are alone. That is, rather than updating a visitor's permanent marketing profile, an embodiment recognizes that their current profile effectively changes based on the visitor's present company. In this way, embodiments enable marketers to correctly tailor and personalize content for the visitor based on who he is currently with in a venue.

Example embodiments are described herein in the context of systems and methods for selecting content to be delivered to visitors to real-world venues such as brick-and-mortar stores. The systems and methods can use IoT devices such as beacons positioned in a real-world venue to identify visitors to the venue. A visitor can be identified by using the IoT devices to track the visitor's physical actions and by accessing a profile that includes previously collected visitor information associated with the venue. The systems and methods can use the profile and information from IoT devices to determine if the visitor is in the venue with members of a group associated with the visitor. Based on determining that the visitor is present at the venue with members of the group, content is selected content for the visitor while that visitor is physically present in the venue.

Embodiments solve problems with traditional marketing tools that do not take into account who is accompanying a visitor in a venue before selecting content to be presented to the visitor. By employing the disclosed techniques that determine whether a visitor to a venue is alone or with a group, and using that determination to select content to be presented to the visitor, a marketer can tailor content to visitors based on who they are currently with in the venue. For instance, promotional content can be sent to a mobile device carried by a customer in a store based on determining that the customer is shopping in the store with family members.

In accordance with certain embodiments disclosed herein, improved visitor behavioral analysis techniques involve observing visitor behavior and interactions in an offline environment. These observations can be made using, for example, IoT devices such as beacons that are positioned at retail outlets, restaurants, stadiums, and other venues where visitors are likely to spend time and make purchases while visiting the venues as members of a group. The beacons are capable of communicating with mobile computing devices, such as smartphones, that are carried by the visitor and accompanying visitors in the visitor's group. The observed visitor behavior provides actionable insights into how a visitor behaves when shopping at a venue with a certain group. For example, the people that a particular visitor often spends time with can be identified as a group associated with that visitor. If the visitor makes a purchase when with members of the group, this can be observed to understand the types of purchases made by the visitor when the visitor is at a venue with that group. In certain embodiments, group membership can also be derived from online or mobile activity (such as, for example, texting or messaging), social media based 'Friends' (i.e., by using an app to access a visitor's friend list), or login information for a visitor. Group membership can also be determined by direct IoT communications between mobile devices. For instance, two or more people jogging together could have wearable fitness tracking devices with them that communicate directly to each other to share progress and exercise goals. This type of data is available to identify these people as being members of a group of friends because they have already taken the time to sync up their wearable devices (either manually or automatically).

Metrics that quantify a visitor's level of connection to other visitors allow marketers to more effectively target the visitor based on who he is currently shopping with. For example, IoT devices can be used to track a visitor's activities and the tracked activities can be used to populate an IoT connection graph. Example of IoT connection graphs are provided in FIGS. 3 and 6. In addition, if it is known that a particular visitor is shopping alone, that visitor's digital marketing profile can be supplemented based on information known about the visitor's purchasing history while shopping alone. This supplemented marketing profile can be used to more effectively target the visitor by personalizing promotional content based on whom, if anyone, the visitor is currently with. Numerous configurations, modifications, and alternative implementations will be apparent in light of this disclosure.

In contrast to online shopping environments, brick-and-mortar stores and other real-world shopping venues are not able to identify visitors as shopping with a members of group such as a family, a household, friends, colleagues, or a couple. The lack of being able to identify visitors as visiting a real-world shopping venue with a member of a group prevents real-world shopping venues from efficiently tailoring content for visitors while they are shopping in the venues with a group, and do little or nothing to take into account different behaviors the visitor may exhibit while shopping with different groups (e.g., family members, friends, or co-workers) or while shopping alone. Embodiments described herein utilize mobile electronic devices carried by visitors and devices otherwise interacted with by visitors while shopping in a real-world shopping venue to identify the visitors as belonging to a group to tailor content presented to the visitor based on who the visitor is currently shopping with in the venue. Information about visitors' past in-store activities (e.g., previous purchases in the venue while alone and with different groups) is used to identify those visitors as being part of a cohesive group such as a couple or family.

Below are some example use cases where a visitor (e.g., John) to a venue may exhibit different behavior depending on who he is currently with in the venue (i.e., John's current company). Embodiments handle these cases by using an audience management platform to tailor content for the visitor based on who that visitor is currently with in order to take advantage of the fact that the visitor's behavior is different when he is alone compared to when he is with his family members, friends, or colleagues. In one example, if John has a health aliment, he typically buys medicine from a drugstore or pharmacy only when he's visiting the drugstore or pharmacy alone. In another example, when John goes to a venue (e.g., a store or restaurant) with a financially conservative friend, he buys conservatively, whereas when he goes to the venue with his girlfriend, he spends more lavishly. In yet another example, John generally orders alcoholic beverages when dining in a restaurant, but when he goes to a restaurant with his parents, he does not order alcoholic beverages. Similarly, John typically orders non vegetarian meals when he is in a restaurant with his co-workers, but orders vegetarian meals when he is with his significant other (spouse or girlfriend). In another example, John goes to a home appliances section of a store only when he is shopping the store with his family members.

Embodiments improve on existing techniques by placing a visitor such as John in a user segment (e.g., non-vegetarian, vegetarian, drinker, abstainer) based on his current companion(s). For example, when a patron reaches a restaurant, embodiments enable a marketer to target this person automatically (i.e., using push notifications to the visitor's smartphone to present a customized menu) with vegetarian or non-vegetarian dishes based on who he is visiting the restaurant with. In this example, when this same patron is visiting the restaurant with his girlfriend with whom he only eats vegetarian dishes, embodiments correctly place this person in a vegetarian user segment. By placing the patron in the correct user segment based on his current companion(s), embodiments avoid presenting the patron with marketing content that does not match the patron's current user segment. In this way, embodiments improve efficiency of marketing systems and content management platforms by reducing wasteful marketing by a vendor (e.g., a restaurant). In this example, by tailoring content sent to a restaurant patron based on his dining companion(s), embodiments avoid sending irrelevant content that may annoy the patron. For example, if notifications regarding only non-vegetarian dishes and menus are pushed to the patron's mobile device while he is in a restaurant with his vegetarian girlfriend, these notifications will be ignored by the patron.

An example method tailors content for different visitors as follows. A first visitor is initially placed in a segment based on that visitor's individual marketing profile. For example, the visitor may be placed in a user segment corresponding to diabetic people based on previous purchases of medication. A visitor in such a segment can have the following traits: he regularly buys medication A, or he regularly buys medication B, or he regularly buys any number of medications and medical products for diabetics. This first visitor has been observed (i.e., based on data collected by IoT devices in a real-world shopping venue) to buy diabetes medication at a particular store (e.g., a particular pharmacy or drugstore) irrespective of whether he is in the store alone or with any companions. The next time this visitor reaches the particular pharmacy or drugstore, a marketer for the pharmacy or drugstore can query an audience management platform, such as, for example, Adobe® Audience Manager to determine the visitor's user segment (e.g., diabetic). Based on the observed shopping history for this visitor, his user segment in that pharmacy or drugstore will be the same regardless of whether he is shopping alone or with companions.

The method can be applied to a different, second visitor as follows. The second visitor has been observed buying diabetes medication only when he is alone or when he is with his family at the pharmacy or drugstore. When this second visitor reaches the pharmacy or drugstore, the marketer can query the audience management platform to determine the second visitor's user segment (e.g., diabetic). In this case, the user segment will be dynamically updated based on whether the second visitor is shopping alone or with his family. If it is determined (i.e., based on data collected by IoT devices in the pharmacy or drugstore) that the second visitor is accompanied by members of another group besides his family (e.g., friends or colleagues), the visitor's user segment will be updated to be non-diabetic.

Similarly, techniques can be applied to tailor other content, such as, for example, fertility drug recommendations. Such content can be embodied as push notification sent to a person visiting a pharmacy based on the person's past purchases. The push notifications can be sent to a mobile device associated with the person. For example, the mobile device can be an iOS or Android device that supports display of push notifications. FIG. 4 provides an example of content tailored to a person who, based on his shopping profile and current companion, may be interested in fertility recommendations. In this example, a method determines, based on who the person is with in a store, that it is appropriate to send personalized content (such as the example fertility recommendations 400 shown in FIG. 4) to the user if the user is shopping alone or with a spouse. However, no fertility recommendations are sent if the person is visiting the store with a friend or co-worker. In this way, the method avoids embarrassing the person by sending a recommendation while that person is visiting the store with his friends or co-workers.

One embodiment identifies visitors who routinely visit a real-world shopping venue as belonging to a group such as a family or a couple. Visitors are identified as visiting a real-world shopping venue with a member of a group based on their activities while visiting the venue. Once identified as being in a venue with members of a certain group, the venue can provide personalized content to the visitor while shopping in the venue based on previous shopping activities exhibited with the group. The visitor can interact with an interface to browse or approve items to be purchased in the venue. The interface can be provided by a content management tool, such as, for example, Adobe® Experience Manager.

Another embodiment determines if a visitor to a real-world shopping venue is in the venue with a cohesive group based on data past in-store activities of the visitor and group members. After identifying the visitor as being a member of a cohesive group (e.g., a family, a household, or a couple), during the visit to the venue (e.g., a store), the visitor is provided with an interface that presents tailored content while shopping in the venue. This embodiment can include the following steps: (1) identify people who have visited a real-world shopping venue (e.g., a store) as constituting a group (e.g., a couple, a household, or a family); (2) determine whether a shopper currently visiting the store is accompanied by other visitors who are in the group; and (3) provide an interface that presents personalized content to the visitor based on the visitor shopping with members of the group. For example, a female member of a couple may purchase certain types of items only when shopping with a male member of the couple (e.g., her husband). Similarly, the husband may only browse or purchase certain items while he is shopping in the store with his wife. In this example, the male member of the couple can be presented with personalized content in an interactive interface to view or explore certain items while his female partner is also in the store. In this way, the male can be more effectively targeted while the two members of the couple are in the store shopping together. Examples of such personalized content are provided in FIG. 4. The content (e.g., images of the products and information about the products) can be rendered on the couples mobile devices by a content management tool. In one example, the content management tool can be Adobe® Experience Manager.

In another embodiment, a system includes an audience management platform for determining that a visitor to a venue belongs to an audience segment, and for determining who is accompanying the visitor at the venue. The system also includes a content management tool configured to present an interface to a store visitor via interactive displays on the visitor's mobile device. The system can determine that the visitor is alone or with a group based on detected in-store activities and visitor profiles. For example, the system can determine that a visitor has come to a store with his female partner. The in-store activities can be detected using Internet of things (IoT) devices, such as, for example, sensors, beacons (including one or more static beacons, beacon stickers, and mobile beacons), embedded touchscreens, Global Positioning System (GPS) devices, radio-frequency identification (RFID) tags, webcams, mobile computing devices (e.g., tablets and smartphones), and other IoT devices that can be present in the store. For example, if the visitor and companions are in front of an in-store display screen, a camera integrated into the screen or mounted near the screen can capture an image of the visitor and the companions. At this point, the system can identify the visitor and any companions in the captured image using a facial recognition technique, and then identify a user segment corresponding to the visitor and the companions accompanying the visitor. A marketer can use the user segment to tailor content presented on an interactive display screen (e.g., a screen of the visitor's mobile device).

Another embodiment identifies visitors who routinely visit a real-world shopping venue (e.g., a brick-and-mortar store) as being part of the same cohesive group based on data from their in-store activities. The data can include tracked physical actions such as previous visits to a store together with other members of the group. In certain embodiments, the cohesive group can be one or more of a couple, a family, or a household (e.g., a group of housemates or roommates). After identifying a group of visitors as being members of the group, on their next visit together to the real-world shopping venue (e.g., the store), an end-user experience is provided to the visitors when they are physically shopping together in the real-world shopping venue (e.g., within the store). This experience includes a user interface that enables a marketer to send personalized content to a visitor based on determining that the visitor is shopping with a family member. For instance, personalized content such as that shown in FIG. 4 can be presented on an interface to suggest items to a male member of a couple shopping together based on determining that he has purchased similar items in the past while shopping with his female partner.

Numerous benefits are provided by the techniques disclosed herein. By automatically determining if a visitor to a real-world shopping venue is currently shopping with members of a group, and providing personalized content via an interactive interface accessible by the visitor, the visitor's shopping experience is improved, and the likelihood of a purchase is increased.

These illustrative examples are given to introduce the reader to the general subject matter discussed here and are not intended to limit the scope of the disclosed concepts. The following sections describe various additional aspects and examples with reference to the drawings in which like numerals indicate like elements, and directional descriptions are used to describe the illustrative examples but, like the illustrative examples, should not be used to limit the present disclosure.

As used herein, the terms "visitor", "shopper", "person", "customer", and "user" refer to any to any person that shops for, browses, buys, rents, or uses goods or services offered at a real-world shopping venue. A visitor to a real-world shopping venue can interact with a screen of a digital signage device in the venue, and an image of the visitor can be captured by a camera associated with the digital signage device. The image can include the visitor, and members of a group accompanying the visitor (e.g., friends, co-workers, or family members).

As used herein, the term "group" refers to any cohesive group of people. A group can include a couple (e.g., spouses), a family, or a household. For example, group members can be housemates or roommates sharing the same house or apartment. Group members can be people who have visited or shopped at a real-world shopping venue alone or with other people belonging to the group.

As used herein, the phrase "real-world shopping venue" refers to a physical location where products or services are offered to visitors. A visitor present at a real-world shopping venue is at the real-world shopping venue in person. For example, a person walking through the aisles of a store is a visitor to a real-world shopping venue who is present at the venue. As another example, a person testing items in an outdoor market is present at a real-world shopping venue. Online stores are not real-world shopping venues. Thus, a person using a desktop or laptop computer at the person's residence to shop for products by accessing a webpage is not present in real-world shopping venue. A real-world shopping venue can be a brick-and-mortar store, a retail store, a department or section within a store, an area of an airport where products are sold (e.g., a duty free shop), a public transit station, a retail kiosk or stand, a music or sports venue where merchandise is sold, a museum gift shop, or any other customer-accessible location where products or services are offered to customers. In certain embodiments, real-world shopping venues can include other real-world venues such as motor vehicles, homes, aircraft, and other physical places where a visitor can be physically present. Advertisements and other content can be tailored for the visitor based on whether the visitor is alone or with members of an identified group. For example, a passenger in a car can be a visitor to the car. The passenger can be accompanied by a driver of the car and one or more other passengers. In this example, while present in the car, the passenger can be presented with advertisements based on who else is in the car (i.e., based on the determining that the passenger is in a group with the driver and/or other passengers).

As used herein, the phrases "interactive display", "in-store screen" and "digital signage device" refer to any computing device configured to display electronic content and interact with customers in a real-world shopping venue. In one embodiment, a digital signage device has a display device (e.g., a screen), an input device (e.g., a touchscreen, pointing device, mouse, microphone, or keyboard), and hosts a browser. The browser can display electronic content from a web server. The electronic content can include descriptions of products, product images, three-dimensional (3D) models of products, and product videos. In some embodiments, digital signage devices can be embedded devices at a location in the real-world shopping venue such as, for example, information kiosks, wall-mounted devices, customer service counters, or table-mounted devices at locations in a store.

As used herein, the phrase "mobile device" refers to a portable electronic computing device such as a smartphone, a tablet, a laptop, a watch, a wearable electronic device, and other similar devices.

As used herein, the terms "electronic content", "content", "website content," and "digital content" refer to any type of resource or media that can be rendered for display on computing devices. Electronic content can include text or multimedia files, such as images, 3D graphics, video, audio, or any combination thereof. Electronic content can include digital signage content, product images, 3D product models, and website content. Electronic content can also include application software that is designed to perform one or more specific tasks at a computing system or computing device. Computing devices include servers, client devices, and mobile devices such as, but not limited to, servers, desktop computers, laptop computers, smartphones, video game consoles, smart televisions, tablet computers, portable gaming devices, personal digital assistants (PDAs), and wearable devices (e.g., smartwatches). Electronic content can be streamed to, downloaded by, and/or uploaded from computing devices. Electronic content can include multimedia hosted on web sites, such as Internet web sites, intranet web sites, standard web pages, or mobile web pages specifically formatted for display on mobile computing devices. Electronic content can also include application software developed for computing devices that is designed to perform one or more specific tasks at the computing device.

As used herein, the terms "application" and "app" refer to any program configured to access and retrieve information hosted on a computing system (e.g., content from a store's web site hosted on a server, a content management system, and/or a content delivery system) and to render the information at a user interface. Examples of such applications include a content management tool, a web browser, a mobile application (e.g., a store's mobile app), a script or a plug-in that runs within a web browser, a program that is hosted in a web browser, a program that is separate from but that interfaces with a web browser such as retailer's or store's mobile app, and other types of programs capable of using local memory and a rendering engine to access and render electronic content.

Example System

FIG. 1 illustrates an example system for identifying visitors shopping at real-world venues while carrying or interacting with electronic devices. In particular, FIG. 1 is a block diagram depicting an example of a system 100 for identifying customers shopping at a real-world shopping venue 104 as belonging to a group. As shown, certain components of system 100 can be implemented, for example, in the real-world shopping venue 104. In one example, the real-world shopping venue 104 is a retail store and determinations made by server 102 are used to identify visitors 106a-b in the real-world shopping venue 104 as belonging to the same group. Visitors 106a-b use client devices 108a-b while shopping in the real-world shopping venue 104. Visitors 106a-b also interact with products, such as a product attached to product device 116. In the example of FIG. 1, the product device 116 can be a beacon. That is, product device 116 can be an IoT beacon device attached to a product within venue 104 that broadcasts its location to nearby portable electronic devices, such as client devices 108a-b. When a visitor 106 is in range of a beacon, the visitor's client device 108 receives the beacon's location and provides the location information to a local server 112 or another collection point in venue 104.

FIG. 1 is a block diagram depicting an example system 100 for identifying visitors to a real-world shopping venue as belonging to the same group. Certain components of system 100 can be implemented, for example, in an open retail environment such as real-world shopping venue 104. System 100 is configured to identify visitors to a real-world shopping venue, such as shoppers in a store, as visiting a real-world shopping venue with a member of a group, such as a family or couple. System 100 can be used to identify visitors 106a-b shopping at real-world shopping venue 104 while the visitors 106a-b are carrying or interacting with electronic devices 108a-b. In one example, determinations made by server 102 are used to identify individuals in the real-world shopping venue 104. Visitors 106a-b use client devices 108a-b while shopping in the real-world shopping venue 104. The visitors 106a-b also interact with products that are attached to product devices, such as the example product device 116 shown in FIG. 1. The physical actions of individual visitors to venue 104 are tracked by monitoring the locations and uses of client devices 108a-b and product device 116. For example, local server 112 can receive information from product device 116 through a wireless network when identifying when the product device 116 is picked up. The location of the visitors 106a-b can be determined based on client devices 108a and 108b. In certain embodiments, location information of a visitor's client device 108 can be detected and sent to local server 112 at the real-world shopping venue 104. For example, GPS data coordinates can be periodically sent from client devices 108 to local server 112, and these coordinates can be used to determine a visitor's location. According to this example, an application executing on visitor's client device 108 can detect the device's location and transmit GPS coordinates to local server 112. In another example, the product device 116 can include a beacon sticker placed on a product in the real-world shopping venue 104 and the beacon sticker can be used to determine when a visitor 106 is near the product. According to this example, proximity of a client device 108 to such beacons can indicate that the visitor 106 is currently near the product. The beacon sticker on the product can have a built in accelerometer which can be used to determine when the visitor 106 has picked up the product or placed the product in a shopping cart. The physical actions of individuals in a real-world shopping venue can be tracked in additional and alternative ways.

Information about the physical actions of the visitors 106a-b is provided to server 102 through network 115. Server 102 uses the information about the physical actions to make determinations as to whether the visitors 106a-b are members of a group. For example, server 102 may determine to that one individual visitor 106a is member of a family or couple that includes visitor 106b based on previous, simultaneous visits to venue 104 by both visitor 106a and 106b. The determination can also be made based on visitors 106a and 106b remaining in a particular section of the venue 104 together for more than 15 minutes (or any other appropriate time threshold). Such a threshold may be used by server 102 to determine that visitors 106a and 106b are shopping in the same section of a store together.

As another example, server 102 may determine that visitors 106a and 106b belong to the same group based on a database or profile for the group that is populated with data from past visits to venue 104 by visitors 106a and 106b. In this example, server 102 can collect data for visitors 106a-b to venue 104 for various days in order to determine if patterns have been observed in the past for these visitors. For instance, server 102 may identify that visitors 106a and 106b entered venue 104 at approximately the same time and exited venue 104 at approximately the same time. Server 102 can store such entry and exit time data in records of a visitor profile. The records for past visits may indicate that visitors 106a and 106b have visited venue 104 together a certain number of times within a time period (e.g., ten times over the past six months). In this example, the visitor profile indicates that in the last 6 months that there have been 10 occurrences where visitors 106a and 106b visited the venue 104 on the same day. Server 102 can use the visitor profile to determine out of these 10 occurrences, how many times again the entry and exit times for visitors 106a and 106b were the same or within an appropriate time threshold (e.g., within five minutes). Server 102 can use the visitor profile to obtain information indicating that out of the ten occurrences, nine of the occurrences have the same entry and exit times for visitors 106a and 106b. Based on this data, server 102 can identify, with an acceptable confidence level, that visitors 106a and 106b are a part of same group (e.g., in the same family or couple). This is because the visitor profile indicates that out of the last ten times visitor 106a has visited venue 104, nine times this visitor's entry and exit times were approximately the same as the entry and exit times for visitor 106b. This indication provides server 102 with a high confidence that both visitors 106a and 106b are a part of same group. This can be used by server 102 as a first filtering condition for visitor data to determine group membership for visitors.

Once it is determined that visitors 106a and 106b are a part of same group at venue 104, interactive display 114 can be used to present content tailored to visitors 106a and 106b. Interactive display 114 can be a digital signage device with its own screen in a section of a store. For example, interactive display 114 can be incorporated into an informational kiosk or a wall-mounted digital signage device at a location in the store. Interactive display 114 is configured to display product images, product summaries, and other dynamic content to visitors 106a-b in the store. Interactive display 114 can have input devices (e.g., camera 120, a touchscreen display, a keyboard, a pointing device, or other input devices) that the visitors 106*a-b* can use to provide input. The store's webpage or other content pertinent to the store can be displayed on the screens of interactive display 114. For example, if interactive display 114 is in the store's men's shoe section, images of men's shoes available for purchase at the store may be displayed. The interactive display 114 can access respective camera 120 (e.g., a webcam) installed near interactive display 114. For instance, a video camera 120 mounted at the top of the screen of interactive display 114 can capture video frames of visitors 106*a-b* as they pause in front of interactive display 114. Webcam 120 can stream images in real time to local server 112 and server 102 via communications network 115 as it captures video frames of visitors 106*a-b* as they pauses in front of interactive display 114.

In one example, the product device 116 is a beacon sticker placed on a product in venue 104 to identify when visitor 106*a* picks up the product or places the product in a physical shopping cart. Beacon stickers on products have a built in accelerometer. A visitor's client device 108 proximity to such beacons can indicate which product(s) that the visitor 106 is currently near to. For instance, if visitor 106*a* picks up a product with product device 116 that is a beacon sticker adhered to the product, this can be detected by the accelerometer in the beacon sticker. In another example, a beacon can be a stationary or static beacon placed in a particular section of the venue 104 to identify when the visitor 106*a* is in that section of the store. Physical actions of visitors 106*a-b* within venue 104 can be tracked by monitoring the locations and uses of client devices 108*a-b* and product device 116. For example, local server 112 can receive information from product device 116 through a wireless network when identifying when the product device 116 is picked up. The location of the visitors 106*a-b* can be determined based on client devices 108*a* and 108*b*. The physical actions of visitors to a real-world shopping venue can be tracked in additional and alternative ways.

There are differences between stationary beacons and beacon stickers. Stationary beacons have a relatively larger battery than a beacon sticker and are designed for stores so that they can be deployed at checkout aisles, entry/exit gates, various product sections, demonstration areas, and other stationary locations within a real-world venue. A beacon sticker can be attached to an individual product or item within a real-world venue. Beacon stickers can turn things into 'nearables' (e.g., smart products fully detectable by a client device 108). For example, it can be determined if a visitor is coming closer or moving away from the beacon. An app on a client device 108 can measure and visualize the distance between the visitor's position and the beacon to tell if the visitor is coming closer to the beacon, moving away, or if they have stopped, and to create events relevant to the context the person is in.

For example, a beacon broadcasts its ID and the strength of the signal, or Received Signal Strength Indication (RSSI) is being continuously monitored by the client device 108. Based on the signal strength and calibration data, it is possible to infer how far away the client device 108 is from the beacon.

Interferences in signal strength can be eliminated. Because of possible interferences, it is important to sample the signal strength in a way that will filter out sudden spikes and dips, which would influence the read-out. This can be done by using a rolling average, which takes into account multiple read-outs, not just one. This stabilizes distance value, at the expense of slight degradation of responsivity.

Beacons can come with additional sensors. For example, beacons and beacon stickers can both be equipped with accelerometers and temperature sensors, making it possible to measure both motion and the surrounding environment. This means a retailer or store can design mobile apps to react if a nearby beacon is shaken or moved. Additionally, a beacon can track the number of times it was in motion since the last counter reset.

Embodiments are not limited to this example system 100, and it would be apparent to those skilled in the art that other display devices can be used in embodiments described herein as interactive displays and digital signage devices, including, but not limited to, embedded devices, personal computers, mobile devices such as smart phones, laptops, tablet computing devices, or other devices suitable for rendering content on a screen. Many additional devices can be used with system 100, beyond the components and devices illustrated in FIG. 1. For example, interactive display 114 can be any digital signage device implemented using any suitable computing devices for communicating via a LAN and/or WAN 115, and rendering a user interface (UI), and/or executing a browser to render a store's web site.

Information about the physical actions of the visitors 106*a-b* is provided to server 102 through network 115. Server 102 uses the information about the physical actions to make determinations to facilitate selecting and providing content to the visitors 106*a-b*. For example, server 102 may determine to provide individual visitor 106*a* content that includes promotional or assistance information pertaining to products in a particular section of a store based on that visitor 106*a* remaining in that particular section of the store for more than 20 minutes (or any other appropriate time threshold). As another example, server 102 may determine that visitors 106*a* and 106*b* are members of a group based on the visitors' tracked physical actions within real-world shopping venue 104, including physical actions from past visits to the venue.

As shown in FIG. 1, each of product device 116, interactive display 114, and client devices 108*a-b* are communicatively coupled to the local server 112. This coupling can be through a local area network (LAN) such as a LAN at a store. The local server 112 is in turn communicatively coupled to server 102 and audience management platform 110 via network 115. The network 115 can be a wide area network (WAN). Some interactive display 114 can be implemented as embedded digital signage devices that have integrated input devices or controls thereon not requiring the use of an external input device. For example, interactive display 114 can be embodied as a kiosk with an embedded touchscreen within the kiosk.

Server 102 can include any suitable computing system for hosting and delivering content. For instance, server 102 can host a content management tool. The server 102 can be a backend server that is remote from interactive display 114 at venue 104. In one embodiment, server 102 and local server 112 may be hosted on a single computing system. In other embodiments, server 102 and local server 112 may be hosted on separate servers, or on a virtual server implemented using multiple computing systems or servers connected in a grid or cloud computing topology. As described below with reference to FIG. 11, system 100 can be implemented on a computing system having a single processor in a multi-core/multiprocessor system. Such a system can be configured to operate alone with a single back end server 102, or in a cluster of computing devices operating in a cluster or server farm used to implement system 100.

Electronic content and other data may be exchanged between components of system 100 via a data communications network such as the Internet, a wide area network (WAN) 115, or a local area network (LAN). For instance, in a real-world shopping venue 104 where browsers, interactive display 114, and camera 120 are installed as components of in-store digital signage devices, a LAN at the venue 104 can be used to exchange data between local server 112 and interactive display 114. In embodiments, an in-store LAN and/or WAN 115 can be one of or a combination of a wireless or wired network such as WiFi®, Internet, Hybrid Fiber Coax, Data Over Cable Service Interface Specification (DOCSIS), ATM or any other wired or wireless network. A content management tool hosted on server 102 may store and deliver content including, but not limited to, interactive 3D product models, product images, streaming video of product demonstrations, web content for the store's web site, in-store advertisements, and the store's promotional content. Certain types of delivered content can be interactive and can be manipulated by visitors 106a-b at interactive display 114. For example, a shopper may be able to rotate, zoom, and otherwise manipulate a 3D image of a product image that the shopper is viewing on an interactive display 114. By using interactive display 114, a store visitor 106a whose image is captured by camera 120 will be able to view and interact with content that has been selected and tailored for the visitor 106a based the visitor's identity.

Although only one interactive display 114 is shown in FIG. 1, it is to be understood that by using system 100, tailored product content can be presented to multiple digital signage devices in the real-world shopping venue 104 such as multiple sections of a store. For example, a first interface including a set of product images tailored for visitor 106a can be displayed on interactive display 114 while another set of product images tailored for visitor 106b can be displayed on interactive display 114.

Interactive display 114 at different locations in a store can establish respective network connections via a LAN and local server 112 with each other. The interactive display 114 can also establish respective network connections with server 102 via network 115 or another suitable WAN. A browser or content player application can be executed at interactive display 114 to establish network connections via a LAN to access content of a retailer's or store's web site. The network connections can be used to provide targeted content by communicating packetized data representing the content to interactive display 114 based on the locations of the interactive display 114 and identified visitors 106a-b. Embodiments improve the efficiency and operation of system 100 by automatically tailoring content to a particular customer who is viewing an interactive display 114 instead of providing the same content or all of the store's or retailer's electronic content to each interactive display 114 in the store. For example, embodiments reduce the amount of product content sent to interactive display 114, thus using less computing resources to transmit content via a LAN and network 115, while also requiring fewer resources from interactive display 114 to render the content. That is, tailoring product content based on: the location of an interactive display 114; the identity of a visitor 106 near the interactive display 114; and the group the visitor 106 belongs to avoids the need for system 100 to transmit and present a wider range of product images and product content. Using server 102 and/or local server 112 to automatically select product content and images based on the location of an interactive display 114 within venue 104 and the identity of a visitor 106 near the interactive display 114 also enables system 100 to present relevant product content to the visitor 106 in near real-time while the visitor is still viewing interactive display 114. The system 100 may select certain product content to the visitor 106 based on determining that the visitor is alone in venue 104 (i.e., not visiting with a group). For example, the system 100 can select content pertaining to certain types of products that the visitor 106 has previously purchased or interacted with when visiting venue 104 alone. Similarly, the system 100 can select and present content associated with other types of products that the visitor 106 has previously reviewed, purchased, or otherwise interacted with when visiting venue 104 with members of an identified group.

Interactive display 114 can be integrated with respective computing devices that host browsers. As illustrated in FIG. 1, interactive display 114 can be communicatively connected to camera 120, which can read images of visitors 106a-b that are near interactive display 114. For example, camera 120 can be mounted on the top of interactive display 114 so that camera 120 can capture images of visitor 106a as he shops and pauses in front of interactive display 114. The system 100 accesses a data backend, such as server 102, in order to obtain content to be presented on interactive display 114. In one embodiment, electronic content to be presented can be designated or selected by a marketer using a user interface of a content management tool (see, e.g., content management tool 228 of FIG. 2). For example, a content management tool may be used to select product images and other electronic content that is presented on interactive display 114.

The content management tool (e.g., content management tool 228 of FIG. 2) and server 102 can be located off-site, remote from a store location where interactive display 114 and camera 120 are located. The content management tool 228 can be implemented as part of a content management system providing a marketer user interface (UI), a staging area for campaign content, and publishing of activated campaign assets. Examples of marketer UIs are discussed below with reference to FIGS. 6-8. In one example embodiment, a content management tool such as Adobe® Experience Manager can be used as the content management tool 228. The content management tool 228 can maintain sets of assets for a promotional or marketing campaign to be displayed on in-store screens. In some embodiments, content management tool 228 can be implemented as a content delivery system.

The interactive display 114 with camera 120 can receive data from a content management tool via network 115. The data can include electronic content of a store's or retailer's website such as HTML documents, product images, product videos, et al. to be displayed. The interactive display 114 can be configured to use a browser to display content of the store's web site that can be persisted on a web server such as server 102 or local server 112. The content of the web site can include images read by camera 120. As shown in FIG. 1, an image read by camera 120 can be transmitted to local server 112 and on to server 102 via network 115. After the read image is received by a content management tool (e.g., a tool hosted on server 102), the image can be transmitted to an image processor for processing. Product images and 3D product models can be presented to a visitor 106.

Figure 2:
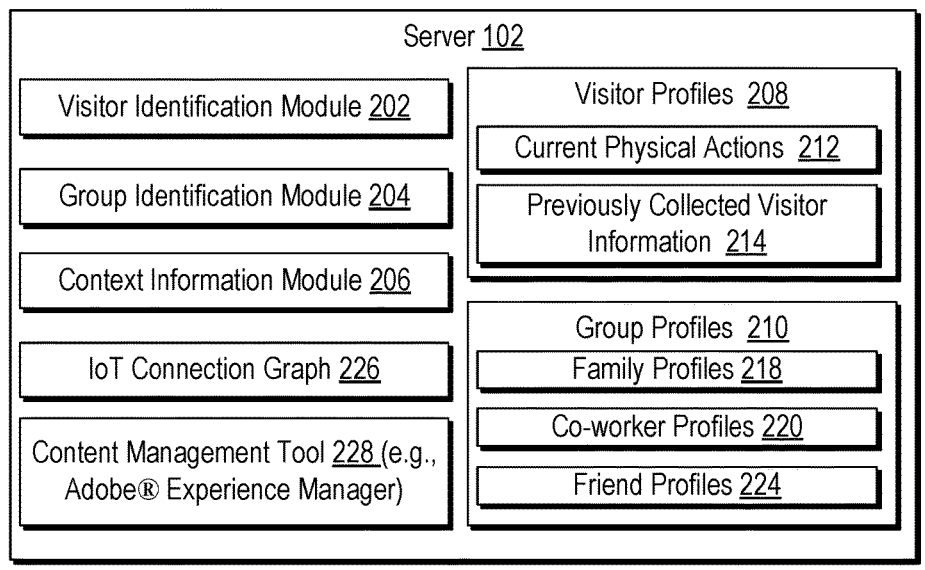
FIG. 2 is a block diagram illustrating exemplary modules for implementing functions in the server of FIG. 1, in accordance with embodiments.

In the example of FIGS. 1 and 2, interactive display 114 can send a video frame image read by camera 120 to a content management tool hosted by server 102 (see, e.g., content management tool 228 of FIG. 2). An image processor on server 102 can process the video frame to determine that the image includes a person who stopped to look at a screen of an interactive display 114 or is within range of a camera 120. For instance, the image processor can detect, based on an image from camera 120, that the image includes a shopper at an in-store display screen of an interactive display 114 (e.g., visitor 106a at interactive display 114). Once the image processor detects a person, it can pass the image of the person to clothes detector that can detect shapes in the image. The clothes detector can detect shapes of clothing items worn by a visitor 106 in the image using an automatic shape detection technique. Examples of such techniques include assistive clothing pattern recognition and automatic clothing pattern recognition. As would be readily apparent to one of ordinary skill in the art, assistive clothing pattern recognition and automatic clothing pattern recognition can be used to perform shape recognition for clothing item shapes as well as color identification for clothing item shapes. For example, a clothes detector can detect shapes of multiple clothing items (e.g., a shirt, jeans) worn by visitor 106a near interactive display 114. Such detected clothing item shapes can then be compared to items in the store's catalogue or inventory to determine if they correspond to a particular product offered by the store.

By using an image capture device such as a camera 120, the interactive display 114 can detect that visitor 106a or 106b has paused in front of or is viewing the screen, and then use the camera to capture an image of the visitors. That is, the image of visitor 106b can be input obtained via camera 120. Camera 120 can capture images periodically. For instance, a webcam installed near interactive display 114 can capture video frames every second or every five seconds. For example, camera 120 of interactive display 114 can be used to identify visitor 106a, and to identify products that visitor 106a is accompanied by visitor 106b. When it is determined that a captured image (e.g., a video frame) includes a visitor, an interactive display 114 analyzes this particular frame and determines see if a visitor is in close proximity to the interactive display. If so, the interactive display 114 provides the video frame to local server 112 that can perform steps to identify the visitor. The video frame can also be used to perform facial pattern recognition so as to identify people accompanying the visitor in the store.

Visitor 106a can interact with an input device of interactive display 114 such as a touchscreen, to place items in a virtual sharing cart. The visitor 106a can then chose to share the sharing cart with visitor 106b who is in a different section of real-world shopping venue 104. Visitor 106b, who can be identified as being near interactive display 114, can then be provided with product information and images for items in the sharing cart that visitor 106a has previously reviewed or purchased while being accompanied by visitor 106b. In one embodiment, visitor 106b is identified using camera 120 of interactive display 114. In additional or alternative embodiments, visitor 106b is identified based on a determination that client device 108b is near interactive display 114. For example, GPS data coordinates received from client device 108b periodically at some specific points of time at local server 112 can be used to determine that visitor 106b is near interactive display 114. In one example, the GPS coordinates can be collected by a retailer's application installed on client device 108b and periodically transmitted to local server 112 for the purposes of identifying visitor 106b and tracking the visitor's movements and actions within venue 104.

In FIG. 1, an administrator 118 of server 102 is remote from the real-world shopping venue 104. Administrator 118 can be located remote from the real-world shopping venue 104 and thus exchange information with local server 112 by communicating through network 115. The administrator 118 can use audience management platform 110 to establish and adjust settings for server 102. For example, by interacting with the audience management platform 110, the administrator 118 can set thresholds for a number of visits or entry/exit time windows that server 102 uses to determine if visitors are part of a group. In additional or alternative embodiments, the administrator 118 can be located within the real-world shopping venue 104 and thus can be an administrator for local server 112. As shown in FIG. 1, the administrator 118 can interact with an administrator device that is embodied as an audience management platform 110.

FIG. 2 is a block diagram illustrating exemplary modules and tools for implementing visitor identification functions in server 102 of FIG. 1. Similar modules could additionally or alternatively be used in the local server 112 of FIG. 1, local to the real-world shopping venue 104, or on any other appropriate device or devices and at any appropriate location or locations. The server 102 includes modules 202, 204, and 206, IoT connection graph 226, as well as content management tool 228, which each are implemented by a processor executing stored computer instructions. As shown in the example of FIG. 2, content management tool 228 can be embodied as an Adobe® Experience Manager system.

The visitor identification module 202 comprises instructions that, when executed by a processor, uses information about a visitor's current physical actions 212 and/or previously collected customer information 214 from visitor profiles 208 to identify visitors to venue 104. The visitors can be identified based on images captured by one or more cameras 120 in venue 104. Identified visitors are analyzed by group identification module 204 to determine if the visitors are members of the same group. This can involve identifying that a visitor has visited venue 104 at the same time as another visitor more than a threshold number of times within a duration, that the visitor's pattern of movement within venue 104 corresponds to another visitor's pattern of movement, that the visitor has picked up at least a threshold number of one type of product also picked up by another visitor, that the customer has picked up a particular product multiple times or for at least a threshold amount of time corresponding to a number of times or amount of time another visitor has picked up or examined the product. The visitor's current physical actions 212 are the physical actions tracked during the visitor's current shopping experience in the real-world shopping venue 104. After the visitor's shopping experience, this information is analyzed and/or added to the visitor's profile 208, for example, being compiled into information stored in the previously collected visitor information 214 of the visitor profiles 208.

The group identification module 204 comprises instructions that, when executed by a processor, use information about a visitor's current physical actions 212, previously collected visitor information 214, and/or group profiles 210, to determine that the visitor is a member of a group. Group identification module 204 can identify a group based on the visitor's prior visits to the venue 104, the visitor's current physical actions in the venue 104, and/or any other criteria or combination of criteria. A visitor's group can additionally or alternatively be identified based on information received from a visitor, e.g., using customer preference information stored in visitor profiles 208 or information received from the visitor during the customer's current shopping experience at the real-world shopping venue 104.

In one specific example, a visitor's current physical actions 212 while in a venue are used in conjunction with previously collected visitor information 214 to conclude that the customer belongs to a group. The current physical actions 212 and previously collected visitor information 214 are compared to data in the group profiles 210 to determine a number of occurrences when the visitor visited the venue with a member of a group over a duration. The number of occurrences in the duration is compared to a threshold to determine if the visitor belongs to a group. For example, if the previously collected visitor information 214 indicates that the visitor has been to the venue 104 fifteen times in the past six months with a member of the group and the visitor's current physical actions 212 indicates that the visitor is currently in the venue with that member, the group identification module 204 can determine that the visitor belongs to the group. In this example, if the visitor has been to the venue 104 fifteen times over the past six months with members of a family in the family profiles 218, the group identification module 204 determines that the visitor is a member of the family. In another example, if the visitor has been to the venue 104 fifteen times over the past six months with members of a family or couple in the family profiles 218, the group identification module 204 determines that the visitor is a member of the couple. That is, the group identification module 204 determines that the visitor is a partner or a spouse of another person in the family profiles 218. Based on other visitation patterns and frequencies, the group identification module 204 can also determine that the visitor is a co-worker of another person in co-worker profiles 220. Similarly, the group identification module 204 can determine that the visitor is a friend of another person in friend profiles 224.

Server 102, in FIG. 2, also includes a context information module 206. Context information module 206 identifies context information for visitors shopping at a real-world shopping venue. The context information module 206 comprises instructions that, when executed by a processor, use information about a visitor's current physical actions 212 and/or previously collected visitor information 214 from visitor profiles 208 to provide useful context information. For example, context information for a visitor can identify, based on the visitor's physical actions 212 while in the real-world shopping venue, that the visitor is interested in men's sportswear and previously collected visitor information 214 can shows that the visitor is a former customer who purchased a Brand A men's apparel item six months ago, purchased a Brand B men's apparel item one year ago, and that the visitor's shopping and browsing history indicates an interest in Brand A, Brand B, and Brand C apparel products when shopping with companions who are in a group profile 210. This enables system 100 able to provide tailored product content to the visitor on an interactive display 114 near the visitor based on this context information. The context information enables a store to better sell products and services that the visitor is interested in, as well as cross sell additional products and services.

In an example embodiment, a web site displayed at interactive display 114 can connect to content management tool 228 for content retrieval purposes. For example, an in-store interactive display 114 can connect to the remote server 102 that hosts content management tool 228 in order to obtain content for a store website via network 115. The interactive display 114 retrieves content for a website, which can be shown to store visitor 106a on a large screen (e.g., a connected/smart television, a conventional television, or computer display device, including a liquid crystal display (LCD) or a light emitting diode (LED) display) of the of the interactive display 114. The content can include product-related electronic content, such as, for example, 3D product models, product documents, product demonstration videos, product images, or any other product-related content relevant to products offered by the store. The content, when displayed on the interactive display 114, can be specifically adapted for visitor 106a viewing the screen of the interactive display 114. In some cases, the content includes feedback from visitor 106b regarding items visitor 106a has placed in a sharing cart. In such cases, visitor 106b interacts with nearby interactive display 114 in order to provide feedback on items in the shared cart of visitor 106a. Such feedback can be displayed on a screen of interactive display 114 so that visitor 106a can view the feedback. Interactive display 114 can be embodied, for example, as embedded devices with large, mounted screens. Each of the interactive display 114 can be associated with respective, fixed locations in the real-world shopping venue 104. In certain embodiments, the content management tool 228 can be Adobe® Experience Manager.

In an additional or alternative embodiment, an application (e.g., the store's mobile app) installed on client devices 108a-b carried by visitors 106a-b can provide interaction capabilities similar to those described above with regard to interactive display 114. In this embodiment, the store's application can be downloaded from server 102 via network 115 or from local server 112 when visitors 106a-b are visiting venue 104. The store's application can provide a user interface on client devices 108a-b that enable visitors 106a-b to provide personalized promotional content to visitor 106a while he is shopping in real-world shopping venue 104 with visitor 106b. For example, visitor 106a can be identified through collection of data by the store's IoT devices in conjunction with data received at a mobile application installed on client device 108a while he is in venue 104. This identification, combined with a determination that visitor 106b is in the venue 104 with visitor 106a, causes the mobile application to send a push notification to visitor 106a based on analysis of visitor 106a's behavior when shopping with visitor 106b. In this example, visitor 106b is determined to be a member of visitor 106a's group (e.g., a family member, co-worker, or friend). Visitor 106b, who is in venue 104, can also interact with the store's mobile app installed on client device 108b in order to receive personalized content based on determining that visitor 106a is currently shopping in venue 104. As with the interactive display 114, the mobile app can be used to explore products offered for sale in the real-world shopping venue 104.

The locations of visitors 106a-b as they move within a venue's floor plan may be determined by one or more beacons, e.g., devices positioned in a fixed location within the store that broadcast their locations to nearby portable electronic devices. When a visitor 106 is in range of a beacon, the customer's electronic device (e.g., client device 108) receives the beacon's location and provides the location information to a server or other collection point. In one example, a beacon is placed in a particular section of the store to identify when the customer is in that section of the store. In another example, beacon stickers are placed on products (see, e.g., product device 116 in FIG. 1).

The real-world shopping venue 104 can be a store with an IoT-enabled environment that includes static beacons, beacon stickers, mobile beacons, and radio frequency identification (RFID) tag readers. As described above, static or stationary beacons can be located in various sections such as at entry/exit gates, points of sale/cash registers (e.g., checkout aisles), display counters, interactive displays, product sections, demonstration kiosks, at a customer service counter, and other locations within a real-world venue. The proximity of a visitor's smart device (e.g., client device 108a or 108*b*) to a static beacon can be used to identify the section in which the visitor 106 is currently present.

Beacon stickers with built in accelerometers can be placed on products in the store. A visitor's smart device proximity to such beacon stickers can indicate which product(s) the visitor 106 is currently near. If the visitor 106 picks up a product with a beacon sticker adhered to it, this can be detected by the accelerometer in the beacon sticker. For example, a beacon sticker with an accelerometer can be affixed to a sample product and used to determine both how long the visitor is in the section of the store and that the visitor picked up the sample product.

Physical shopping carts and in-store screens (e.g., interactive display 114) used by visitors 106*a-b* can be fitted with mobile beacons and RFID tag readers. Like beacon stickers, the mobile beacons have accelerometers and can be used to determine a visitor's smart device proximity to the mobile beacons. The mobile beacons mounted to physical shopping carts can indicate which cart a particular visitor 106 is currently using. In another embodiment, RFID tags or near field communication (NFC) devices are used to determine the locations of visitors 106*a-b*. A visitor can carry an electronic device with an RFID tag or an RFID reader that interacts with RFID tags and/or RFID readers in the store to determine the visitor's location.

With continued reference to the example system 100 of FIG. 1, the example group comprising visitors 106*a-b* shopping in the store can each have their own client device 108 (e.g., a mobile computing device such as a smartphone or a wearable device). Each client device 108 can have at least one of a retailer's app installed or a third party publisher app (e.g., an app from a content provider such as a "Wall Street Journal" or "ESPN" app). In the example with a third party app, beacons in the store may be provided by a company that has partnership with the retailer. For example, the retailer can install beacons in various sections of the store (e.g., in one or more of locations of venue 104). The third party (e.g., a beacon network company) can provide store analytics data and help the retailer send push notifications to in-store visitors. In this case, the visitor need not have the retailer's app installed on their smart device. The beacon network company can have ties to a few major publishers. If the visitor has an app of any of these publishers on his smart device, store visit data can be collected and personalized. In this way, push notifications can be sent to visitors via a publisher's app helping the publisher to earn some revenue.

An embodiment can identify if a group of visitors who routinely visit a retail store are a part of the same family based on their in-store activities. Such in-store activities can be detected by static beacons, beacon stickers on products, mobile beacons mounted to physical shopping carts used by the visitors, and cameras or other input devices associated with interactive display 114.

The interactive display 114 of FIG. 1 can be used to present an interactive interface to a visitor to a real-world shopping venue. For instance, an interface can be presented on interactive display 114 to visitor 106*a* while the visitor is in the men's outdoors wear section within a men's apparel section of a store. In this example, the visitor 106*a* is able to interact with a touchscreen interface of interactive display 114 in order to select products and items of interest that are offered by the store. The visitor 106*a* may be presented with product images, such as the example images shown in FIG. 4. The product images can be selected by content management tool 228. In certain embodiments, the product images are based at least in part on the identity of visitor 106*a*, previously collected visitor information 214, the visitor's membership in a group such as a family, couple, household, a group of co-workers, or a group of friends, and a determination that the visitor is currently shopping with members of the group.

Interactive display 114 can be communicatively connected to camera 120 via a local network (e.g., a local area network/LAN) in a store and communicatively connected to a content management system via another suitable network (e.g., network 115 of FIG. 1 or any other wide area network/WAN, such as the Internet). Generally, the interactive display 114 can be any type of device, such as a personal computer (PC), tablet, or smartphone, configured to access and present content (e.g., a web page, a menu, a program guide for available media offerings, product images, 3D product models, product summaries and descriptions, product documents and manuals, and other product information) provided by a content-providing server of a content management tool. The digital signage device can include a screen for displaying, among other things, content rendered by a browser. The screen can also be used to display any other type of human-readable content. The screen can include any electronic visual display device (e.g., a conventional television or computer monitor, including a liquid crystal display (LCD) or a light emitting diode (LED) display). In some cases, the screen can be a large screen physically integrated into the digital signage device (e.g., such as found in an information kiosk or a wall-mounted device). In other cases, the digital signage device can be a mobile device having an integrated screen (e.g., such as a tethered mobile tablet device in a store). As would be readily apparent to one of ordinary skill in the art, such a mobile device can include input devices such as buttons and an integrated camera. The camera can be any device configured to detect light and form an image, such as a video camera or a webcam, for example. The screen can include any electronic visual display device (e.g., a conventional television or computer monitor, including a liquid crystal display (LCD) or a light emitting diode (LED) display).

As shown in FIG. 1, the visitor 106*a* is also carrying a client device 108*a*. By way of example, the client device 108*a* can be a smartphone, a tablet device (e.g., iPad® from Apple Inc., a device running an Android operating system, a Microsoft Surface device, or another tablet), a wearable device such as a smartwatch or fitness tracker, or another suitable mobile computing device. That is, the client device 108*a* can be a mobile computing device operating one of a variety of mobile operating systems and platforms, such as the iOS operating system (OS) developed by Apple Inc., the Android platform from Google Inc., a Microsoft Windows® OS, and similar operating systems providing wireless communications, content display, and image capture capabilities. The client device 108*a* can have a store's mobile app installed thereon so that the visitor 106*a* can access scaled down interfaces on the client device 108*a* that are similar to the interfaces shown on interactive display 114.

By way of further example, the interactive display 114 can include personal computers or other suitable computing devices, such as a desktop device. As will be appreciated in view of this disclosure, the interactive display 114 can be any suitable digital signage device and do not necessarily need to stationary by design. For example, if the interactive display 114 is mobile, its screen may be physically integrated into a mobile device, instead of being dedicated, separate displays mounted at locations in a store, as shown in the non-limiting example of FIG. 1. Alternatively, as shown in the examples of FIG. 1, the interactive display 114 can be a device where the screen and camera 120 are physically integrated into the interactive display 114. It will be understood that the functions of the computing devices variously described in this disclosure can be performed on and by any number of computing devices, depending on the particular application of the system. For instance, one or more interactive displays 114 can each include respective browsers, screens, and cameras. The interactive display 114 can include its own web browser or another application suitable for retrieving, processing, displaying and interacting with content provisioned by a content management tool, a store's website server, or any combination of these or other servers. Data representing the retailer's or store's content can be stored in a content repository accessible by the interactive display 114. Such a content repository can be implemented using one or more databases or other storage devices accessible by the interactive display 114.

Content stored in the content repository can be uniquely identified by an address, metadata, filename, version identifier, or other identifying information. Non-limiting examples of such identifying information include a version number, a serial number, a document file name/location (e.g., a URL), a numeric value, an access code, a text string, instructions that can be executed by a processor (e.g., 'retrieve content x from database y'), or any other data usable to identify and retrieve content such as product images, textual product information, product videos, and 3D product models.

Example Workflow

Figure 3:
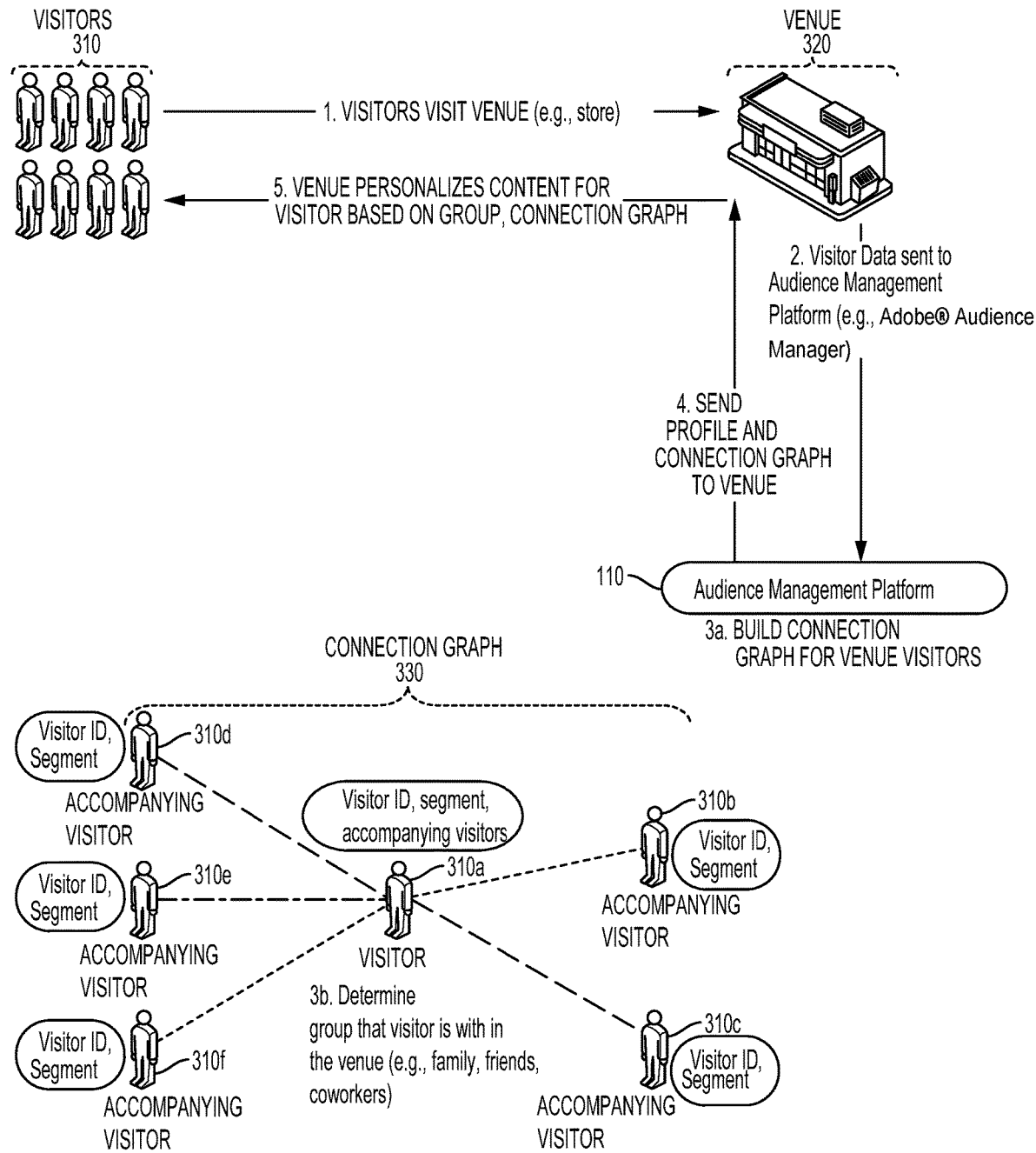
FIG. 3 is a block diagram schematically illustrating an example workflow for analyzing how a visitor to a real-world venue interacts with other visitors, and for using this interaction analysis to allow marketers to determine that the visitor is at the venue with members of a group in order to more effectively target the visitor, in accordance with embodiments.

FIG. 3 is a block diagram schematically illustrating an example workflow for analyzing how a visitor to a real-world venue interacts with other visitors, and for using this interaction analysis to allow marketers to determine that the visitor is at the venue with members of a group in order to more effectively target the visitor. As illustrated, this workflow commences at step 1 with a plurality of visitors 310 visiting a venue 320 such as a retail store, a restaurant, a stadium, or any other place where visitors are apt to spend time and interact with each other. In one implementation, a large population of visitors visits the venue over an extended period of time, such as several days, weeks, or months. The venue includes a number of IoT beacons that are positioned at locations that facilitate analysis of visitor activity at the venue. For example, positioning beacons at entry/exit points provides insight into how much time a particular visitor spent at the venue, and who, if anyone accompanied the visitor to the venue. Positioning beacons in specific departments or areas within the venue provides insight into how the visitor spent time at the venue, and thus provides insight into the visitor's interests. Positioning a beacon at a restaurant table provides insight into whom, if anyone, the visitor dined with. Beacons can be positioned in an essentially unlimited range of locations in and around the venue, including on shopping carts, merchandise, checkout stands, fitting rooms, stadium seating, snack bars, customer service desks, parking kiosks, product demonstration rooms, and the like.

Many of the visitors to the venue will carry a smartphone or other portable computing device. An application running on such a device can record information received from the aforementioned beacons as the visitor who owns the device moves about the venue. For instance, as described above, a visitor's client device 108 can be a smartphone that has a retailer's app or a third party publisher app installed. The retailer's app can be an application provided by a retailer, such as, for example, a mobile app from a pharmacy, department store, or grocery store. Similarly, a publisher app can be provided by a third party publisher of content, such as a mobile app from a content provider (e.g., a "Wall Street Journal", "New York Times", or "ESPN" app). In embodiments using a third party app, beacons in the real-world shopping venue 104 may be provided by a company that has partnership with the retailer. According to these embodiments, the retailer can install beacons in various sections of the venue 104 (e.g., in one or more of locations in a store), and the third party (e.g., a beacon network company) can provide store analytics information and help the retailer send push notifications to store visitors' client devices 108. In this case, the visitor need not have the retailer's app installed on their client device 108. Thus, the information can be sent directly sent to server 102, or routed through intermediary servers owned or managed by different entities or parties. In one implementation, the communications from the beacons to the portable computing device are background communications, and thus do not necessarily require any input or acknowledgement from the visitor carrying the portable device. Thus, as the visitor moves about the venue, the application will generate visitor interaction data that indicates which beacons have been observed by the visitor's device, and when such observations have occurred. Proximity data that reflects an estimate of the distance to an observed beacon is optionally recorded as well. As shown in step 2, this visitor interaction data is sent to an audience management platform 110 periodically. In general, as visitors 310 are observed at venue 320 over an extended period of several days, weeks, or months, audience management platform 110 will collect a large volume of visitor interaction data from which actionable insights regarding group memberships can be extracted. While FIG. 3 illustrates a plurality of visitors visiting a single venue 320, it will be appreciated that in alternative embodiments, visitor interaction data can be collected based on observations made at a plurality of different venues. In additional or alternative embodiments, the venue 320 can be a private venue such a home or motor vehicle of a visitor 310. That is, the venue 320 can be any physical place where one or more visitors 310 can be present.

Figure 9:
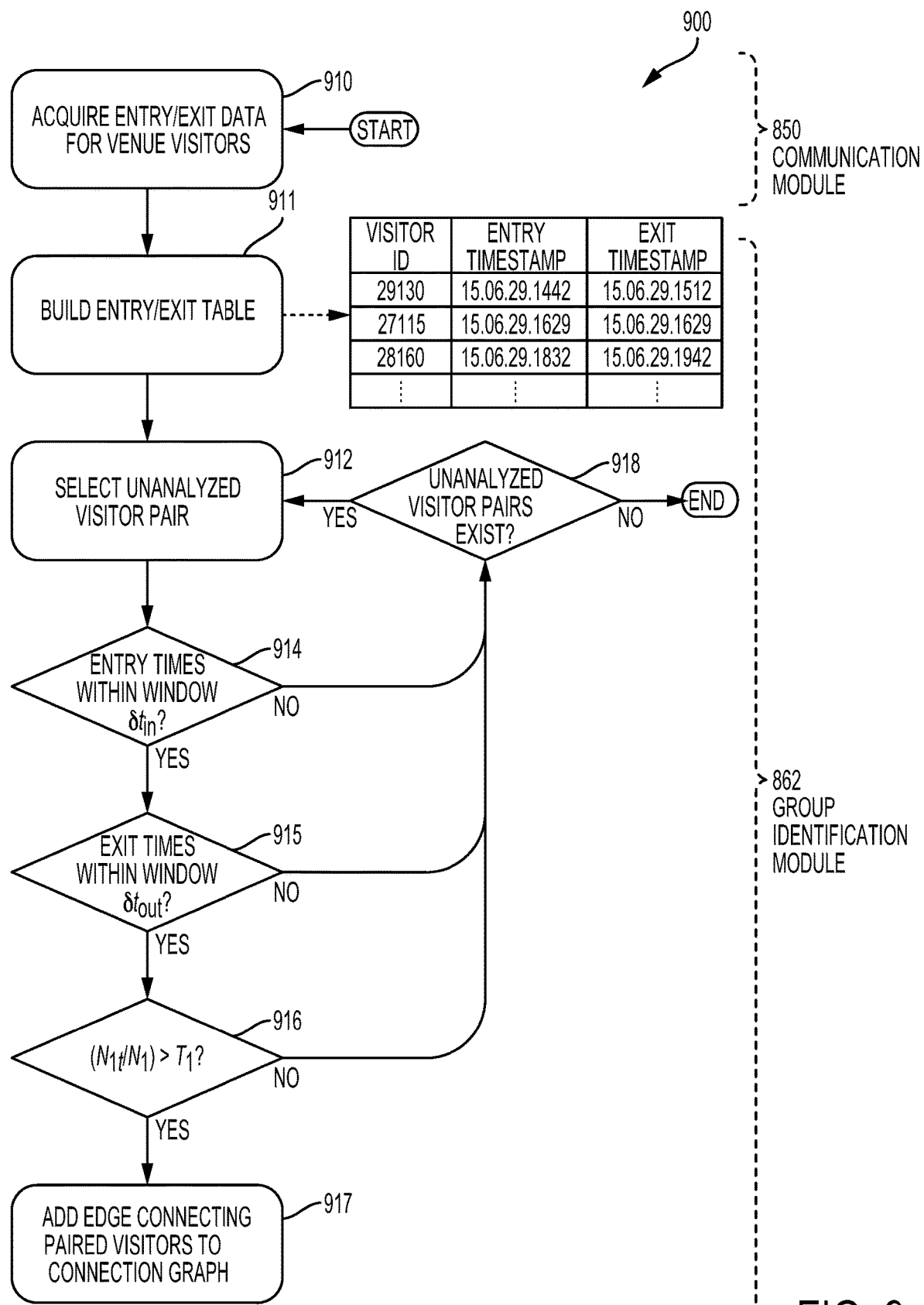
FIG. 9 depicts a flowchart illustrating an example group identification method for determining that visitors who have spent time together in a venue belong to a group, in accordance with embodiments.

Still referring to the example implementation schematically illustrated in FIG. 3, at step 3a of the workflow, audience management platform 110 builds a connection graph 330 for venue 320. A connection graph comprises a plurality of nodes, each of which represents one of the plurality of visitors 310. The visitor interaction data collected by the audience management platform 110 may reveal that two visitors were observed together frequently, or were otherwise observed in a context that would suggest that they may be connected as members of a group. Where this is the case, the nodes representing these two visitors are connected by an edge in the connection graph. Each edge is optionally associated with a degree of confidence in the relationship between the two visitors. For example, visitors who were observed grocery shopping together once or twice a month may be connected by an edge having a high degree of confidence regarding membership in a family group, while visitors who were observed together at the café weekday mornings may be connected by an edge having a high degree of confidence regarding membership in a co-worker or friend group. Additional details regarding how the connection graph can be built are illustrated in FIG. 9, described below.

A wide range of insights can be extracted from a connection graph. For instance, the audience management platform can be configured to determine a group that a particular visitor 310a to a venue 320 is with by building a connection graph for venue visitors. This is shown in step 3b of the example workflow of FIG. 3. As shown in step 3b, the workflow determines other visitors who are accompanying the particular visitor, and such accompanying visitors can be represented as an edge in the connection graph. In this context, the particular visitor may be the visitor to be targeted or presented with personalized content such as tailored marketing content. Referring to the example connection graph 330 illustrated in FIG. 3, a visitor 310a is directly connected to accompanying visitors 310b, 310c, 310d, 310e, and 310f, and therefore these visitors fall within a group associated with visitor 310a. While step 3b of the workflow of FIG. 3 illustrates determining a single group (for visitor 310a), it will be appreciated that, in general, each node in the connection graph may be associated with multiple groups, provided that node is connected to at least one other node. A visitor that is not understood as belonging to a group with any other visitors will not be associated with any group, but may still be provided with personalized content based on his visitor profile and shopping history.

In addition to evaluating which visitors belong in groups with each other, as revealed by the connection graph, in certain embodiments, the audience management platform 110 also determines if the visitors are currently shopping in the venue 320 together. This can be determined by using IoT devices to collect activity data for visitors in an identified group. While FIG. 3 illustrates that each visitor in the venue is associated with a single group, in other implementations different group memberships can be assigned for different visitors.

Once the audience management platform 110 generates the connection graph 330, analytics can be provided to a marketer who may, for example, be associated with the venue 320 where the visitor interactions were initially observed. These analytics enable the marketer to more specifically target visitors based on who they are currently shopping with. For example, if Don is observed as having recently purchased a smartwatch at the Acme Electronics Store, and if the analytics provided by an audience management platform or a consumer analytics portal reveal that Don makes such purchases in the product category 'electronic gadgets', when shopping with co-worker Emily then a marketer associated with the Acme Electronic Store can use these insights to send a targeted solicitation to Don the next time it is determined that he is visiting a shopping venue 320 with Emily. This represents one example of how visitor behavioral analysis can be used to increase the efficacy of a digital marketing campaign in real-world venues.

FIG. 4 depicts personalized content that can be presented to a visitor to a real-world shopping venue. In the example of FIG. 4, techniques have been applied to personalize content 400 that pertains to fertility drug recommendations. Such content can be embodied as push notification sent to a visitor to a pharmacy based on the visitor's past purchases while at the pharmacy with his wife. The push notifications can be sent to a mobile device associated with the visitor. FIG. 4 depicts an example of content tailored to a person who, based on his shopping profile, connection graph, and current companion, may be interested in fertility recommendations. In this example, based on who the person is currently with in a drugstore, that it is appropriate to send personalized content 400 with fertility drug recommendations. This content can be sent, for example, after determining that the person is shopping alone or with his wife. In an additional example, the fertility recommendations of FIG. 4 are not sent if the person is visiting the store with a friend or co-worker. In this way, techniques described herein avoid person by sending the person a potentially embarrassing recommendation while that person is visiting the store with his friends or co-workers.

Example User Interface

Figure 5:
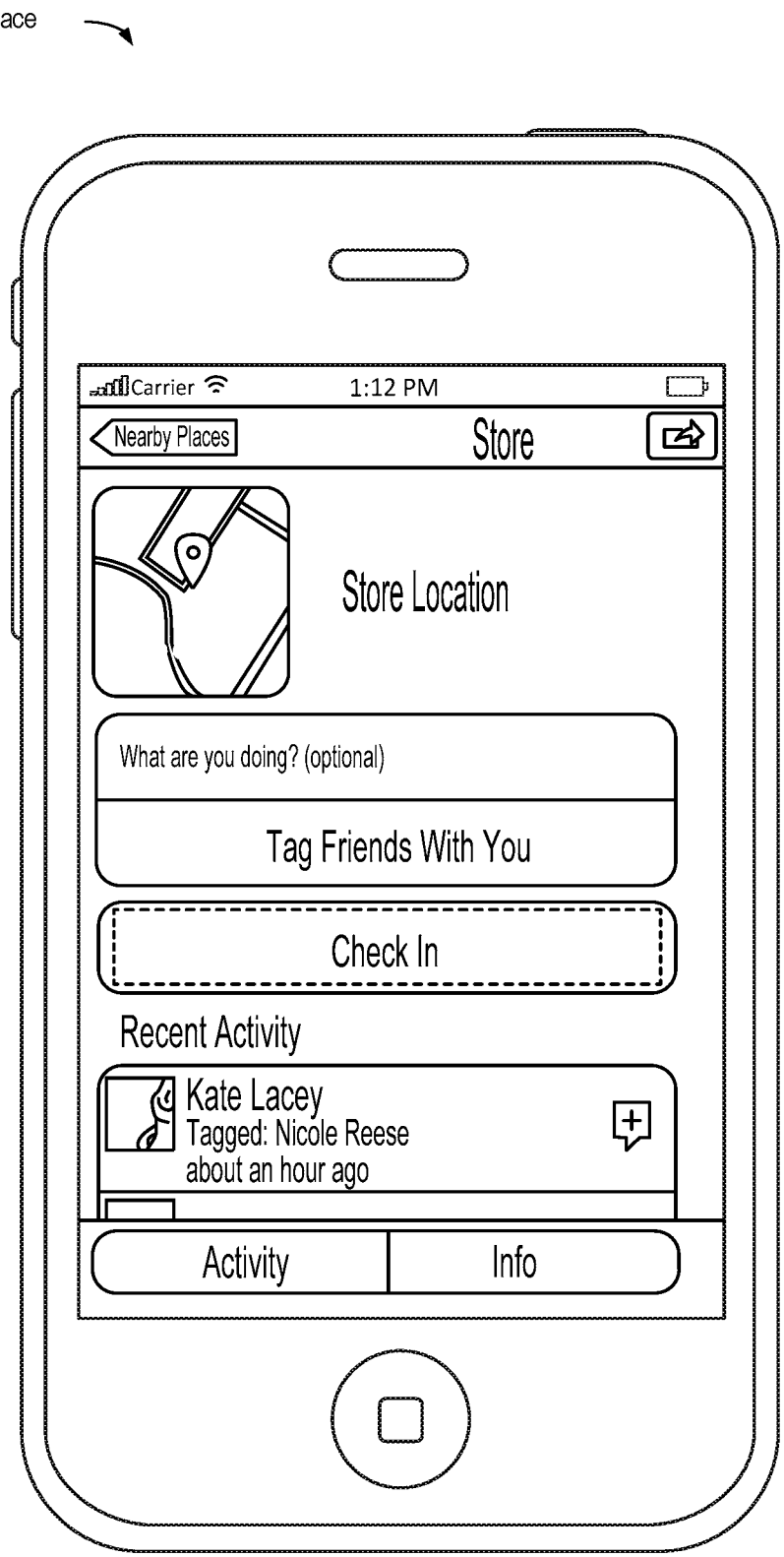
FIG. 5 depicts an example interactive interface presented to a visitor to a real-world shopping venue, in accordance with embodiments.

FIG. 5 depicts an application interfaces for checking in at a real-world shopping venue. Data collected via check in interface 500 of FIG. 5 can be used to determine that a visitor associated with a client device 108 has arrived at a store and who the visitor is with. The user interface (UI) 500 depicted in FIG. 5 is described with reference to the embodiments of FIG. 1. However, the UI is not limited to that example embodiment. In embodiments, the UI can be displayed on display devices of computing devices, such as client devices 108a-b. It is to be understood that the user interface illustrated in the example embodiments of FIG. 5 can be readily adapted to execute on displays of a variety of computing device platforms running a variety of operating systems that support an interactive user interface. Embodiments can supplement data collected by IoT devices at a venue with check in data collected via check in interface 500. For example, social media check in data collected via check in interface 500 can be used in conjunction with data collected from in-store Beacons to determine when a visitor is shopping at a store and who else is shopping in the store with the visitor.

As shown in FIG. 5, a check in interface 500 can be used to determine that a visitor is in a real-world shopping venue. The example check in interface 500 of FIG. 5 includes buttons that a visitor in a store can use to check into a location. The check in interface 500 can be used by a visitor as part of a mobile social media application to notify members of a group that the visitor has arrived at a venue. As shown in FIG. 5, the visitor can use check in interface 500 to notify group members that the visitor has arrived at a store. As shown, check in interface 500 can include a 'tag friends with you' button so that the visitor can indicate who is with the visitor at the store. As shown in FIG. 5, check in interface 500 enables a visitor user to notify others that he is at a real-world venue by selecting the 'Check In' button. In certain embodiments, check in interface 500 can be rendered by a store's mobile app or by a social media app on the client device 108 of the visitor.

Visitors who are accompanying a particular visitor can be determined using a variety of ways. One example technique is as follows:

An IoT Connection Graph can be populated based on the following facts:

When a visitor visits a venue (e.g., a retail store, restaurant, home, car, or sports venue) with others (e.g., relatives, friends, office colleagues, or neighbors), they enter/exit the venue at almost the same time. In this way, an embodiment can identify the combination of visitors that has almost the same entry/exit time for some of their previous visits wherein they visited the venue on the same day.

Further, for certain types of venues such as restaurants, coffee shop, sporting venues, cars, and homes (e.g., visits to a living rooms, home theater or den of a group member's home), the group members will probably use same table in a restaurant, adjacent seats in a sporting venue, adjacent seats on a couch, adjacent seats in a car, and so on.

Social media Check-ins, such as the example shown in FIG. 5, can be used to supplement tracked physical actions of a visitor to a venue. Social media apps offer a "Check In" tool within mobile apps. Retailers can post a sign near the entrance to a store encouraging visitors to Check In. A visitor can tag friends to indicate that the friends have accompanied the visitor to the venue using the 'tag friends with you' button as shown in the example check in interface 500 of FIG. 5.

Example Connection Graph

Figure 6:
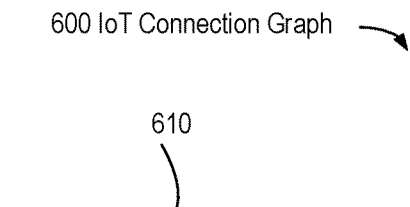
FIG. 6 depicts an example IoT connection graph, in accordance with embodiments.

In the example of FIG. 6, IoT devices can collect data used to populate an IoT connection graph 600. For instance the IoT devices can include beacons such as iBeacons that use the Bluetooth Low Energy (BLE) network technology. As would be readily apparent to one of ordinary skill in the art, BLE is used to transmit data over relatively short distances. BLE communication comprises of advertisements of small packets of data that are broadcast at regular intervals through radio waves. BLE broadcasting is a one-way communication method in that it simply advertises its packets of data. These data packets can then be picked up by smart devices nearby, such as a client device 108. The beacons can be used for a number of applications, such as a retailer's or a store's mobile app, to trigger events such as prompts, push notifications, and app actions. Apple Inc. has standardized a format of iBeacon BLE advertising. As shown in FIG. 6, an iBeacon's advertising packet can include components used to identify a visitor to a venue. For example, the first component in IoT connection graph 600 is a Universally Unique Identifier (UUID) 610 for a visitor. As seen in IoT connection graph 600, the UUID is a string that can be used to identify a visitor.

The second component of IoT connection graph 600 is a user segment 620. As shown, user segments 620 can be assigned based on a visitor's previous behaviors or purchases.

The third component of IoT connection graph 600 is the accompanying visitors 630. As shown, accompanying visitors 630 indicate whether a given visitor is shopping alone or with other members of a group.

In the example of FIG. 6, user segments 620 can be used to specify a visitor's preferences when alone or with a group. For example, the user segment 620 of 'Likes_Horror' in conjunction with the accompanying visitors 630 value of 'Alone' in the IoT connection graph 600 indicates that this visitor tends to purchase horror-related DVDs or media when shopping alone. Similarly, the user segment 620 of 'Likes_Comedy' in conjunction with the accompanying visitors 630 values indicating IDs of accompanying visitors in the IoT connection graph 600 indicates that this same visitor tends to purchase comedy-related DVDs or media when shopping with certain members of a group.

Analytics tools such as Adobe® Analytics can provide a number of different methods to identify visitors and their devices. For example, client devices 108 can be identified by their mobile device IDs. One such method is a 'Subscriber ID Method' that identifies a number of HTTP 'subscriber ID headers' that uniquely identify a majority of mobile devices such as client devices 108*a-b*. Those headers often include the device phone number (or a hashed version of the number), or other identifiers. The majority of current mobile devices have one or more of the headers that uniquely identify the device. These headers contain information on deviceid, clientid, callinglineid for a client device 108.

Example Method for Tailoring Content for a Visitor to a Venue

Figure 7:
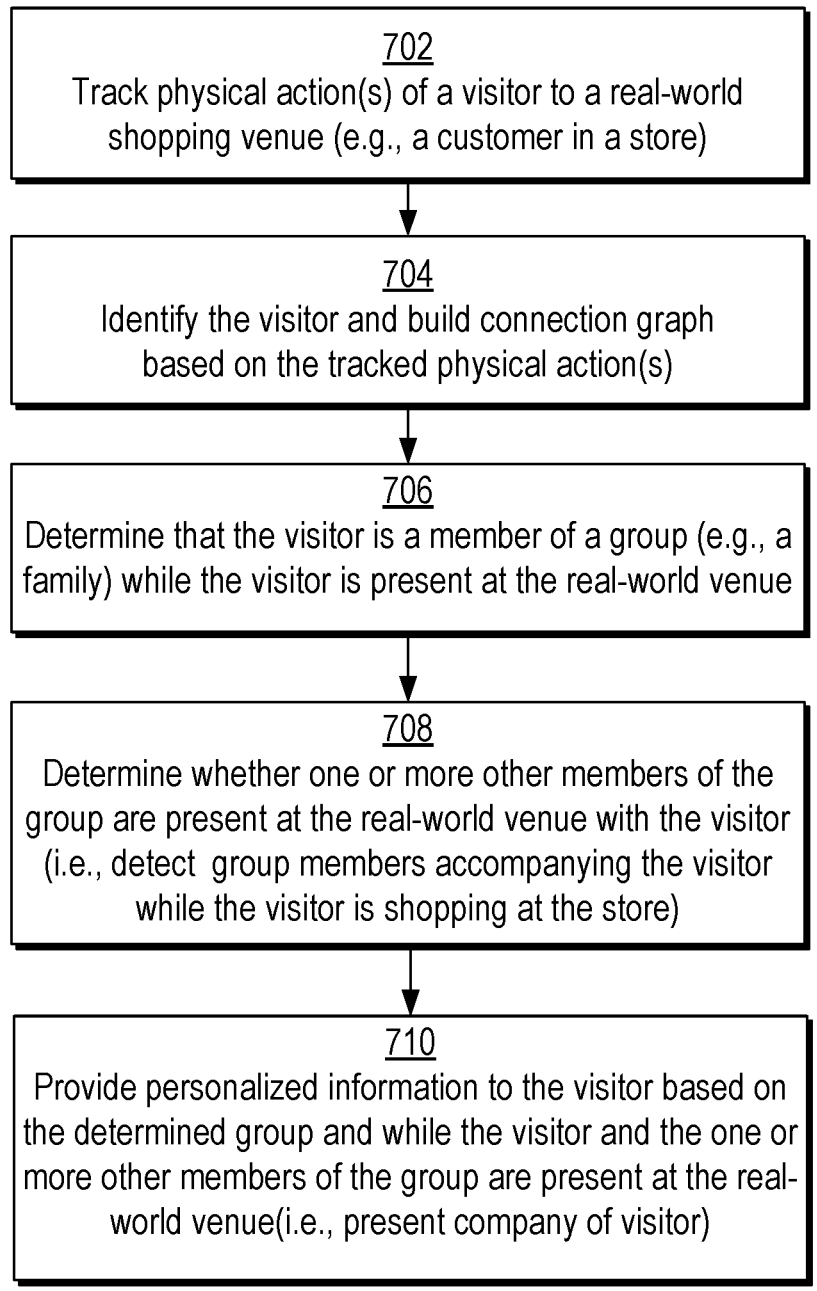
FIG. 7 is a flowchart illustrating an example method for observing visitor behavior and interactions, and for providing personalized information to a visitor based on a group determination inferred from such observations, in accordance with embodiments.

FIG. 7 is a flowchart illustrating an example method 700 for tracking physical actions of a visitor shopping at a real-world shopping venue carrying a mobile device connected to a communication network, using the tracked actions to identify the visitor and to determine that the visitor is present in the venue with or more members of a group, and to provide tailored information to the visitor based on the determination. That is, method 700 can be used to identify a visitor to a real-world shopping venue, determine that the identified visitor is a member of a group, and then provide personalized content to the visitor, in accordance with embodiments. The example method 700 may, for example, be implemented by components of system 100 of FIG. 1. In particular, the example method 700 may be implemented by the server 102, local server 112, client devices 108*a-b*, and interactive display 114 of FIG. 1. The exemplary method 700 is performed by a processor of a computing device executing instructions to perform one or more of the following operations.

Method 700 involves tracking physical actions of a visitor present at the real-world shopping venue, as shown in block 702. Tracking the physical actions, in one embodiment, involves determining that the visitor entered the venue at a certain time, and recording the time stamp and a unique user identifier, such as the example visitor Universally Unique Identifier (UUID) 610 shown in FIG. 6 and described above. Block 702 can include building a visitor's profile. This can entail using a Marketing Cloud Services system development kit (SDK) to pass a Marketing Cloud Visitor ID to an audience management platform, such as, for example, Adobe® Audience Manager along with the corresponding visitor profile data. In certain embodiments, a Marketing Cloud Visitor ID can be a universal visitor ID that is provided by a Marketing Cloud Visitor ID service. For example, a Marketing Cloud Visitor ID can be a unique numeric string contained in a cookie that can be passed as a parameter (e.g., a "mid" parameter) and used across Adobe® Marketing Cloud solutions. In certain embodiments, block 702 can also include obtaining a visitor ID directly from a visitor's mobile device, such as the visitor's smartphone. For instance, in many implementations, a visitor's smartphone, tablet, or wearable device (e.g., a smartwatch, fitness tracker, or some other mobile device carried by the visitor) may be a central hub that is configured to communicate with IoT sensors and other devices. In this example, the visitor's mobile device or IoT devices at the venue can be configured to send information on to a server for analysis and use in tailoring marketing content for the visitor. According to these embodiments, an app on the visitor's mobile device would have a visitor ID for the visitor that would be constant across all communications with IoT devices and beacons that collect GPS coordinates and other activity data for the visitor.

Tracking physical actions can also involve, for example, determining that the visitor has spent more than a threshold amount of time at a particular location or section within the real-world shopping venue. For example, the floor plan of a real-world shopping venue may be segmented into sections, which may have similar or differing sizes. In one embodiment, sections are selected to correspond to particular product types and/or brands. The visitor's location can be tracked relative to these sections. For example, the visitor's location can be tracked to identify that the visitor is moving out of a particular section of the real-world shopping venue to present product information while he is still in the section.

Method 700 further involves identifying the visitor and building a connection graph based on the tracked physical actions, as shown in block 704. The context information about the tracked physical actions from block 702 can be used to identify the visitor in block 704. For example, the context information can identify prior interactions between the visitor and an interactive display 114 in a particular section of the store and other in-store actions. The tracked physical actions can be stored as current physical actions 212 in visitor profiles 208. In block 704, these current physical actions 212 can be used in conjunction with previously collected visitor information 214 of the visitor profiles 208 to identify the visitor. Block 704 can populate a connection graph for the visitor based on the tracked physical actions. After the visitor is identified in block 704, the visitor's placement in a particular segment (e.g., Diabetic) can be determined. This can be accomplished, for example, by querying an audience management platform in order to generate a set of visitors 'S_V' that are in the visitor's segment.

Method 700 further involves determining that the visitor is a member of a group (e.g., a family, a couple, a group of friends, a group of co-workers, or a household) while the visitor is present at the real-world venue, as shown in block 706. This determination can involve refining the set of visitors 'S_V' generated in block 704. This refinement can be accomplished using the connections (i.e., group members from the connection graph) with which they are at the venue (e.g., a store, a restaurant, a theater, a motor vehicle, an aircraft, or another real-world venue) at that time to generate the set of highly relevant visitors a 'S_V.' The set of highly relevant visitors R_S_V can be generated using the following steps:

a. For every visitor 'S_V_i' in the set of visitors 'S_V'
   i. Identify the set of accompanying visitors 'A_S_V_i' with whom visitor 'S_V_i' has come to the venue (e.g., a store, a restaurant, or another real-world venue)
   ii. From the Master Marketing Profile of visitor 'S_V_i' (as updated in block 702 using the past visits with the corresponding accompanying visitors):
      1. Determine if visitor 'S_V_i' exhibits a trait corresponding to the desired segment in the presence of accompanying visitors 'A_S_V_i'
      2. If yes, add 'S_V_i' to the set 'R_S_V'

In one example, the determination of block 706 can involve identifying that a set of visitors are a part of the same family based at least in part on their entry/exit times for previous visits, GPS data, shopping cart sharing during previous visits, and payment means for bills from the previous visits.

Method 700 further involves 708 determining whether one or more other members of the group are present at the real-world venue with the visitor, as shown in block 708. As shown in the example of FIG. 7, block 708 can comprise detecting which, if any, group members are accompanying the visitor while the visitor is shopping at the store. This detection can be accomplished, for example, by using data collected by IoT devices in the venue.

Method 700 also involves providing personalized information to the visitor based on the tracked physical action(s) and the determined group, as shown in block 710. As shown, block 710 can comprise presenting personalized information to a visitor based on determining that one or more members of the visitor's group (e.g., a family member) are currently accompanying the visitor in the venue. Block 710 can provide personalized information to the visitor based the group determined at block 706 and while the visitor and the one or more other members of the group detected at block 708 are present at the real-world venue. That is, block 710 can send a push notification or other transmission of tailored content based on the present company of visitor (i.e., other group members shopping with the visitor in the real-world shopping venue). In one embodiment, the personalized information identifies products that the visitor interacted with in the past while in the real-world shopping venue with members of the determined group.

In another embodiment, the personalized information identifies a product corresponding to a section of the real-world shopping venue where the visitor or a member of the group is present. In another embodiment, the tailored information identifies a product from a related section of the real-world shopping venue that the visitor previously visited with a member of the group. For example, where a visitor purchased or browsed a product from the men's sportswear section at a previous time with a group member, an interactive display near the men's shoe section can display promotional content for related sportswear items to the visitor.

The tailored information can include information about competitor brands that the visitor has purchased or browsed during past visits to the venue with group members. For example, if a visitor has browsed products in the Brand A apparel section for a few minutes, and then moves to the Brand B apparel section with a group member (or alone), an interactive display near the Brand B apparel section can present suggested combinations of Brand A and B apparel items. In this way, the tailored information can also include cross-selling information.

The tailored information can also include information about features of the product or category of interest to the visitor. Such interest, in one example, is determined based on additional tracking technologies. For example, eye tracking technology can be used by a camera 120 of an interactive display 114 to determine that the visitor prioritizes certain characteristics and features of a product displayed on the interactive display 114.

The tailored information can also be based on determining that a physical shopping cart is occasionally shared by the group members (e.g., the visitor's family members). The tailored information can also be based on determining that payment for all the physical shopping carts of the various members of the family is done by the same credit card/payment mechanism. The tailored information can be used to provide a sharing (feedback) mechanism for the visitor as the visitor browses the products on an in-store screen, wherein the products can be shared with the visitor's group members who are present in the store but are in different section.

The tailored information can further be based on automatically identified products that the visitor to a real-world shopping venue is carrying in his hand/cart and allow him to share them with his group members who are present in the store. This can be done via a mobile app interface or interactive displays in the store so that the sharing can be accomplished even when the visitor and the group members are in different sections of the store.

In an embodiment, block 708 includes sending a push notification to a visitor when he is shopping with a group (such as family members or other groups specified by the marketer) at a real-world shopping venue. By carrying out blocks 702-708, the method 700 can automatically tailor content for a visitor to a real-world shopping venue such as a store based on who is currently accompanying that visitor in the store. For example, the method 700 can automatically personalize promotional or marketing content to be pushed or transmitted to a visitor based on determining that the visitor is in the store with one or more members of his family.

Embodiments disclosed herein provide numerous advantages. Certain embodiments can be implemented using a content management tool such as Adobe® Experience Manager. By using the interface of such a content management tool, these embodiments present ways to make a shopping experience highly engaging for families and couples who are shopping together in a store. The impact of making shopping experience family-friendly/couple-friendly on retailers bottom-line can result in higher sales for the store.

Embodiments take advantage of research showing that families and couple shop together many times. For instance, embodiments ensure that appropriate content is sent to a visitor who is a member of a family while the visitor is shopping in a store with family members, hence making the shopping experience fundamentally more engaging for them.

By using the example techniques, when a person visits a retailer's store multiple times with a spouse or partner, if after few visits, when both of the person and spouse/partner are in the store together, embodiments enable a retailer to select content for the person that one member of the couple previously purchased while in the store with their partner. This can be useful, for example, in situations where a couple knows: that they can shop in their respective sections and still receive promotion offers for products they like and have previously reviewed or purchased while with their partner; and that the other partner can also receive the offers. In this way, the couple can efficiently spend their time in the store and make purchases they know their partner has previously reviewed or approved.

Embodiments cover one or more of the following use cases: asking for feedback on items that a family member explored on an in-store screen; asking for feedback on items that are in the family member's hands; and showing relevant items to another family member based on items that are in the cart of first family member.

Example System Implementation

Figure 8:
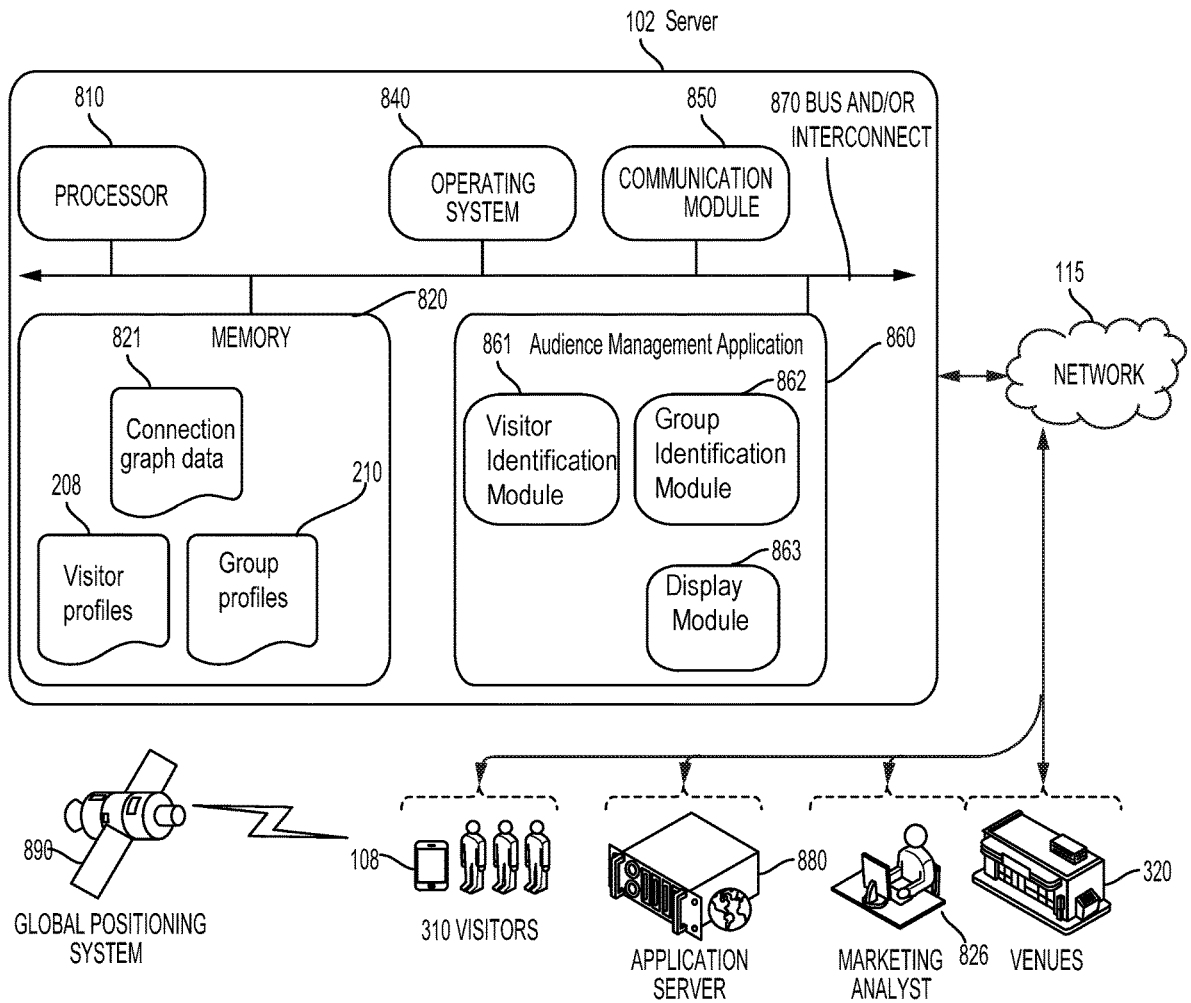
FIG. 8 is a block diagram schematically illustrating selected components and subcomponents of an example computer system that can be used to observe visitor behavior and interactions, and to draw inferences about who is accompanying a visitor based on such observations, in accordance with embodiments.

FIG. 8 is a block diagram schematically illustrating selected components and subcomponents of a server hosting an audience management platform that can be used to observe visitor behavior and interactions, and to draw inferences about group membership and shopping behaviors based on such observations. The server can be implemented as server 802 shown in FIG. 8, which may comprise, for example, one or more devices selected from a desktop computer, a laptop computer, a workstation, a tablet computer, a smartphone, a handheld computer, a set-top box, an enterprise class server, or any other such computing device. A combination of different devices may be used in certain embodiments. In the illustrated embodiment, server 802 includes, among other things, a processor 810, a memory 820, an operating system 840, a communication module 850, and an audience management application 860. Sever 802 is coupled to a network 115 to allow for communication with other computing devices and entities, such as the aforementioned visitors 310 and venues 320. Other embodiments may have fewer or more networks, communication paths, subcomponents, and/or resources, depending on the granularity of implementation.

In certain implementations, server 802 is configured to communicate with a smartphone or other portable computing device that is carried by one of visitors 310. This allows server 802 to acquire data that is collected by one or more mobile applications running on the portable device. Once example of such data is visitor interaction data that characterizes transmissions received from beacons in venue 320. Such data may be aggregated as visitor 310 moves about venue 320 while carrying a smartphone. Another example of such data is geolocation data collected in response to signals received from, for example, a global positioning system 890.

Yet another example of such data is mobile application data that characterizes visitor interactions with a mobile application associated with venue 320, such as an online shopping application. In a modified embodiment the visitor interaction data and/or other observational data is sent from the mobile application to an application server 880, in which case server 802 is configured to retrieve such data from application server 880. Regardless of whether data is acquired directly from visitors 310 (i.e., via their mobile devices 108) or from an intermediate application server 880, it will be appreciated that server 802 is capable of receiving a wide variety of observational data originating from a range of different sources.

In some implementations, venue 320 is associated with a web server or mobile application service provider. In such implementations, application server 880 can be configured to service requests from a website or a mobile application. In such implementations, server 802 can be configured to retrieve visitor tracking data generated by application server 880 itself. Such visitor tracking data may, for example, characterize visitor interactions with a website, an online storefront, or a social media site associated with venue 320. This provides yet another way to observe the activities of visitors 310, and is particularly useful where members of a group are monitored to better understand how a visitor's behavior and purchases change, if at all, when that visitor is with other members of the group. For example, if a member of a group accesses an online storefront associated with venue 320 shortly after a visitor makes a purchase from venue 320, this activity can accurately be associated with the group. In some cases, server 802 is configured to communicate with venue 320 and/or a marketing analyst 826 associated with venue 320 to receive supplemental data that further characterizes visitor activity. One example of such supplemental data is payment information. For instance, the sharing of a payment card between two visitors can be taken as an indication that the visitors are closely related.

The communications with venue 320 and/or associated marketing analyst 826 also include communications of analytics data generated by server 802, such as data characterizing connection graphs. In some cases such data is transmitted directly to venue 320, while in other cases it is transmitted to analyst 826 who generates a marketing strategy based on such analytics. In an alternative embodiment, server 802 includes modules and interfaces that facilitate the creation of a marketing strategy. Such a marketing strategy may include, for example, targeted communications selected for particular visitors where the communications are tailored to the particular visitors based on who they are with in the venue 320, and determining that while they are with a certain group, the visitors may be interested in certain types of products and/or services offered at venue 320. Such strategic information and insights can be transmitted directly to venue 320.

Referring still to the example server illustrated in FIG. 8, processor 810 can be any suitable processor, and many include one or more coprocessors or controllers, such as an audio processor or a graphics processing unit, to assist in processing operations of server 802. Memory 820 can be implemented using any suitable type of digital storage, such as one or more of a disk drive, a universal serial bus drive, flash memory, and random access memory. Operating system 840 may comprise any suitable operating system, such as Google Android (Google Inc., Mountain View, Calif.), Microsoft Windows (Microsoft Corp., Redmond, Wash.), Apple iOS (Apple Inc., Cupertino, Calif.), or Apple OS X (Apple Inc., Cupertino, Calif.). As will be appreciated in light of this disclosure, the techniques provided herein can be implemented without regard to the particular operating system provided in conjunction with server 802 and therefore may also be implemented using any suitable existing or subsequently developed platform. Communication module 850 can be any appropriate network chip or chipset which allows for wired and/or wireless communication via network 115 to external entities and resources such as visitors 310 and venues 320. A bus and/or interconnect 870 is also provided to allow for inter- and intra-device communications using, for example, communication module 850.

Memory 820 can be used to store analytical data that marketers can leverage to more effectively target visitors. For example, in certain embodiments, memory 820 stores connection graph data 821 that defines nodes, connecting edges, and confidence levels that collectively represent links between observed visitors that can be used to determine that the visitors are members of a group. Connection graph data 821 can be used to generate an IoT connection graph, such as illustrated in FIGS. 3 and 6. In some embodiments, memory 820 stores visitor and group profiles 208 and 210, as described above with reference to FIG. 2.

As shown in FIG. 8, server 802 can also include an operating system 840, which can be configured to accept input from an input device. In an embodiment, the input device can be one or more of a keyboard, pointing device, touch screen, microphone, or camera. For example the input device can be a camera associated with a display. For instance, a camera can be a camera integrated with a display or mounted on top of the display. The camera can be a webcam or any other suitable video camera capable of capturing video frames of people viewing the display. For example, camera 120 shown in FIG. 1 can be implemented as an input device to server 802.

In the non-limiting example shown in FIG. 8, memory 820 includes connection graph data 821, visitor profiles 208, and group profiles 210. An audience management application 860 can be implemented using visitor identification module 861, group identification module 862, and display module 863, as well as other computer programs accessible by server 802.

According to one example, audience management application 860 can be a tool included in an audience management platform, such as, for example, Adobe® Audience Manager. By using audience management application 860, a retailer, or administrator 118 can manage content for a store's website or the store's advertising campaign. A content management tool can be used to select and modify product content, and can include an administrator interface for selecting product images and editing product descriptions and offers.

Visitor and group modules 861 and 862 can be the visitor and group identification modules 202 and 204 as shown in the example of FIG. 2, discussed above. The visitor and group modules 861 and 862 can further include the context information module 206. Similarly, memory 820 can store data for the visitor profiles 208 and group profiles 210 shown in FIG. 2.

Example Method for Group Identification

As illustrated in FIG. 9, method 900 commences with using communication module 850 to acquire entry/exit data for a venue. See reference number 910 in FIG. 9. One way of collecting entry/exit data for a venue includes positioning beacons near the venue entrances and exits. As a visitor carries his/her portable computing device through the entry/exit points, an application executing on the device receives an advertising packet from the beacon and records a beacon identifier along with a timestamp indicating when the advertising packet was received. This data can later be passed to an audience management platform. As large numbers of visitors enter and exit the venue over a period of several days, weeks, or months, a correspondingly large quantity of entry/exit data can be acquired. The connection graphing process invoked by method 900 can build an entry/exit table based on the acquired entry/exit data. See reference numeral 911 in FIG. 9. As illustrated, in one embodiment the entry/exit table lists entry and exit timestamps for a particular visitor at a particular venue. In some cases the visitor is identified by a mobile device identifier associated with his/her portable computing device. In other implementations the visitor is identified using a hypertext transfer protocol (HTTP) subscriber identifier header that includes a unique identifier such as a phone number, a hashed version of a phone number, or some other identifier that uniquely identifies the device and therefore the visitor.

In some cases two or more visitors may have entered and/or exited a venue at substantially the same time. These paired entries can be identified by reviewing the entry/exit table for pairs of visitors having similar entry/exit times. This can be done quickly by sorting the table by entry or exit time. Once the table is sorted in this way, adjacent rows of the table represent visitor pairs that can be analyzed. In some cases, where more than two visitors entered or exited the venue within a short time period, rows of the table that are not immediately adjacent to each other can be analyzed as well. In either case, the connection graphing process invoked by method 900 selects a previously unanalyzed visitor pair for analysis. See reference numeral 912 in FIG. 9. The two entry times for the visitor pair are compared to determine if they are within a time window $\delta t_{in}$, which represents a maximum entry time difference beyond which the two visitors are taken to have come to the venue separately. See reference numeral 914 in FIG. 9. Non-limiting example values for $\delta t_{in}$ are 15 seconds, 30 seconds, 45 seconds, and 1 minute. It is to be understood that in additional or alternative embodiments, other values for $\delta t_{in}$, including intermediate values, can be used. If the two entry times are within $\delta t_{in}$, then the corresponding two exit times are compared to determine if they are within a time window $\delta t_{out}$, which represents a maximum exit time difference beyond which the two visitors are taken to have left the venue separately. See reference numeral 915 in FIG. 9. Example values for $\delta t_{out}$ are 15 seconds, 30 seconds, 45 seconds, and 1 minute, although other values, including intermediate values, can be used in other embodiments. If the two entry times are not within $\delta t_{in}$, or the two exit times are not within $\delta t_{out}$, then the two visitors are taken to have entered or exited the venue separately. In either case, the entry/exit table is analyzed to determine whether additional unanalyzed visitor pairs exist. See reference numeral 918 in FIG. 9. If so, the entry and exit times of the next pair of visitors are analyzed similarly.

If the entry and exit times for a particular pair are within the respective time windows $\delta t_{in}$ and $\delta t_{out}$, the visitors' previous visits to the venue are further analyzed. In particular, the entry/exit table is reviewed to identify the most recent $N_1$ instances when the two visitors visited the venue on the same day. Example values for $N_1$ are 2 visits, 3 visits, 4 visits, 9 visits, 8 visits, and 10 visits, although other values, including intermediate values, can be used in other embodiments. Of these $N_1$ previous same-day visits, the number of visits that have entry and exit times within the $\delta t_{in}$ and $\delta t_{out}$ thresholds, respectively, are counted. This value is $N_{1t}$. The ratio $(N_1 \div N_{1t})$ is compared to a threshold value $T_1$. See reference numeral 916 in FIG. 9. If $(N_1 \div N_{1t}) > T_1$, then the two visitors are considered as influencing each other, and nodes connected by an edge representing the two linked visitors are added to a connection graph associated with the venue. See reference numeral 917 in FIG. 9. The confidence evaluation process can be invoked by a confidence evaluation module in order to associate the edge connecting these two visitors with a High confidence level. If $(N_1 \div N_{1t}) \leq T_1$, then the two visitors are not understood as being connected to each other (i.e., being co-members of a group). In this case, the entry/exit table is analyzed to determine whether additional unanalyzed visitor pairs exist. See reference numeral 918 in FIG. 9. If so, the entry and exit times of the next pair of visitors are analyzed similarly. Non-limiting example values for the threshold time parameter $T_1$ are 9%, 10%, 15%, and 20%. It is to be understood that in additional or alternative embodiments, other values for the threshold time parameter $T_1$, including intermediate values, can be used.

FIG. 10 is a table summarizing the visitor analytics parameters used in certain implementations of group identification method 900.

Example Computer System Implementation

Figure 11:
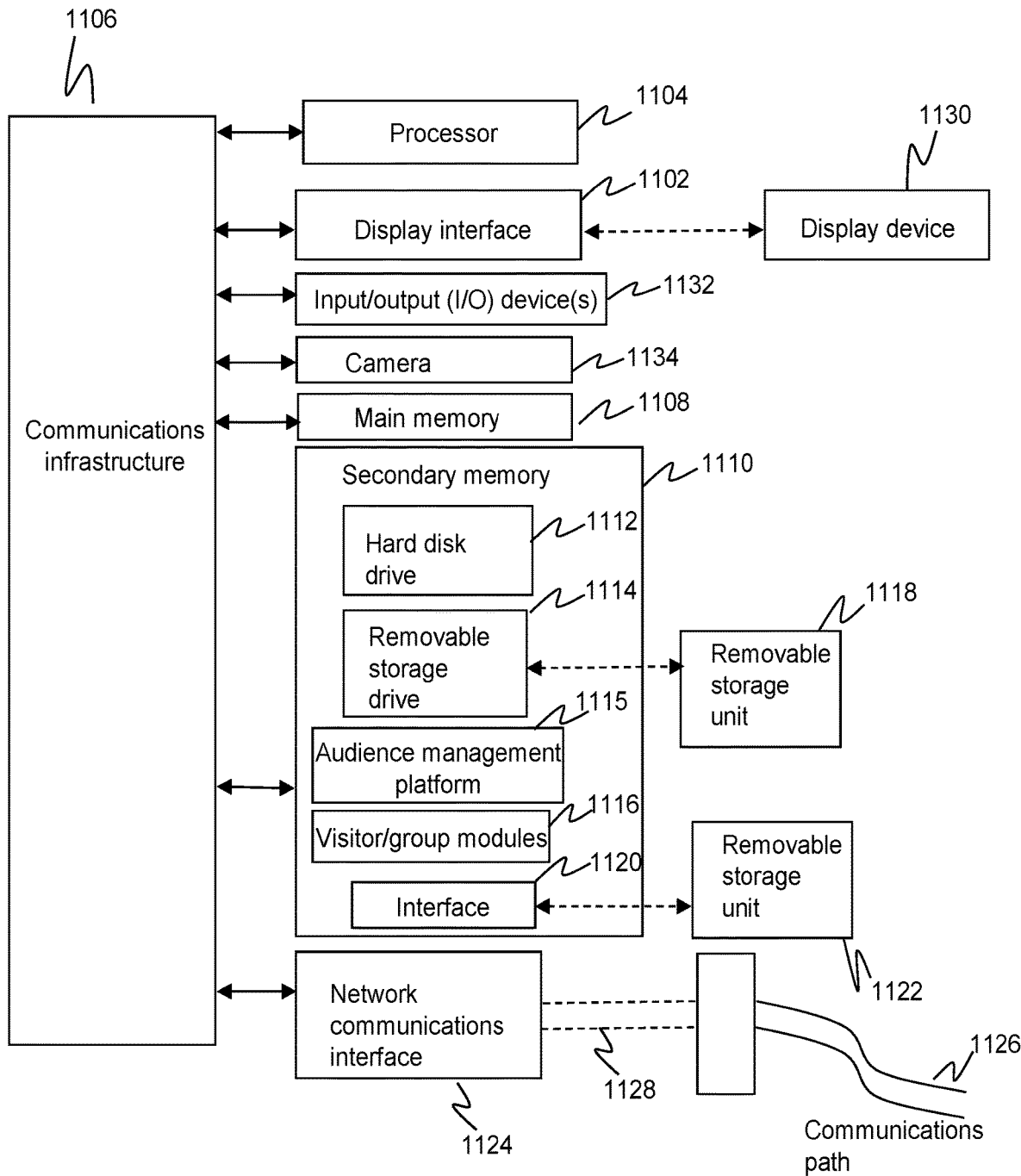
FIG. 11 is a diagram of an example computer system in which embodiments of the present disclosure can be implemented.

Although example embodiments have been described in terms of apparatuses, systems, services, and methods, it is contemplated that certain functionality described herein may be implemented in software on microprocessors, such as a microprocessor chip included in computing devices such as the computer system 1100 illustrated in FIG. 11. In various embodiments, one or more of the functions of the various components may be implemented in software that controls a computing device, such as computer system 1100, which is described below with reference to FIG. 11.

To implement the various features and functions described above, some or all elements of the devices (e.g., client devices 108*a-b* and interactive display 114) and servers (e.g., servers 102 and 112) may be implemented using elements of the computer system of FIG. 11. More particularly, FIG. 11 illustrates an example computer system 1100 for implementing the techniques in accordance with the present disclosure.

Aspects of the present invention shown in FIGS. 1-10, or any part(s) or function(s) thereof, may be implemented using hardware, software modules, firmware, tangible computer readable media having logic or instructions stored thereon, or a combination thereof and may be implemented in one or more computer systems or other processing systems.

FIG. 11 illustrates an example computer system 1100 in which embodiments of the present invention, or portions thereof, may be implemented as computer-readable instructions or code. For example, some functionality performed by system 100 shown in FIG. 1 can be implemented in the computer system 1100 using hardware, software, firmware, non-transitory computer readable media having instructions stored thereon, or a combination thereof and may be implemented in one or more computer systems or other processing systems. Hardware, software, or any combination of such may embody certain modules and components used to implement system 100 and servers 102 and 112 illustrated by FIGS. 1 and 2 discussed above. Similarly, hardware, software, or any combination of such may embody certain modules and components used to implement steps in the flowchart illustrated by FIGS. 7 and 9 discussed above.

If programmable logic is used, such logic may execute on a commercially available processing platform or a special purpose device. One of ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device.

For instance, at least one processor device and a memory may be used to implement the above described embodiments. A processor device may be a single processor, a plurality of processors, or combinations thereof. Processor devices may have one or more processor 'cores.'

Various embodiments of the invention are described in terms of this example computer system 1100. After reading this description, it will become apparent to a person skilled in the relevant art how to implement the invention using other computer systems and/or computer architectures. Although operations may be described as a sequential process, some of the operations may in fact be performed in parallel, concurrently, and/or in a distributed environment, and with program code stored locally or remotely for access by single or multiprocessor machines. In addition, in some embodiments the order of operations may be rearranged without departing from the spirit of the disclosed subject matter.

Processor device 1104 may be a special purpose processor device. As will be appreciated by persons skilled in the relevant art, processor device 1104 may also be a single processor in a multi-core/multiprocessor system, such system operating alone, or in a cluster of computing devices operating in a cluster or server farm. Processor device 1104 is connected to a communication infrastructure 1106, for example, a bus, message queue, network, or multi-core message-passing scheme. In certain embodiments, a processor of one or more of the computing devices and servers described above with reference to FIG. 1 can be embodied as the processor device 1104 shown in FIG. 11.

Computer system 1100 also includes a main memory 1108, for example, random access memory (RAM), and may also include a secondary memory 1110. Secondary memory 1110 may include, for example, a hard disk drive 1112, removable storage drive 1114. Removable storage drive 1114 may comprise a floppy disk drive, a magnetic tape drive, an optical disk drive, a flash memory, or the like. In non-limiting embodiments, one or more of the memories of digital signage devices and servers discussed above with reference to FIG. 1 can be embodied as the main memory 1108 shown in FIG. 11.

The removable storage drive 1114 reads from and/or writes to a removable storage unit 1118 in a well known manner. Removable storage unit 1118 may comprise a floppy disk, magnetic tape, optical disk, or another removable storage unit which is read by and written to by removable storage drive 1114. As will be appreciated by persons skilled in the relevant art, removable storage unit 1118 includes a non-transitory computer readable storage medium having stored therein computer software and/or data.

In alternative implementations, secondary memory 1110 may include other similar means for allowing computer programs or other instructions to be loaded into computer system 1100. Such means may include, for example, a removable storage unit 1122 and an interface 1120. Examples of such means may include a program cartridge and cartridge interface (such as that found in video game devices), a removable memory chip (such as an EPROM, or EEPROM) and associated socket, and other removable storage units 1122 and interfaces 1120 which allow software and data to be transferred from the removable storage unit 1122 to computer system 1100.

Computer system 1100 may also include a communications interface 1124. Communications interface 1124 allows software and data to be transferred between computer system 1100 and external devices. Communications interface 1124 may include a modem, a network interface (such as an Ethernet card), a communications port, a PCMCIA slot and card, or the like. Software and data transferred via communications interface 1124 may be in the form of signals, which may be electronic, electromagnetic, optical, or other signals capable of being received by communications interface 1124. These signals may be provided to communications interface 1124 via a communications path 1126. Communications path 1126 carries signals and may be implemented using wire or cable, fiber optics, a phone line, a cellular phone link, an RF link or other communications channels.

As used herein the terms "computer readable medium" and "non-transitory computer readable medium" are used to generally refer to media such as memories, such as main memory 1108 and secondary memory 1110, which can be memory semiconductors (e.g., DRAMs). Computer readable medium and non-transitory computer readable medium can also refer to removable storage unit 1118, removable storage unit 1122, and a hard disk installed in hard disk drive 1112. Signals carried over communications path 1126 can also embody the logic described herein. These computer program products are means for providing software to computer system 1100.

Computer programs (also called computer control logic) are stored in main memory 1108 and/or secondary memory 1110. Computer programs may also be received via communications interface 1124. Such computer programs, when executed, enable computer system 1100 to implement the present invention as discussed herein. In particular, the computer programs, when executed, enable processor device 1104 to implement the processes of the present invention, such as the steps in the methods illustrated by the flowcharts of FIGS. 7 and 9, discussed above. Accordingly, such computer programs represent controllers of the computer system 1100. Where the invention is implemented using software, the software may be stored in a computer program product and loaded into computer system 1100 using removable storage drive 1114, interface 1120, and hard disk drive 1112, or communications interface 1124.

In an embodiment, screens of interactive display 114 of FIG. 1 used to display content and the user interfaces shown in FIGS. 4 and 5 may be a computer display 1130 shown in FIG. 11. The computer display 1130 of computer system 1100 can be implemented as a touch sensitive display (i.e., a touch screen). The computer display 1130 can connect to communications infrastructure via display interface 1102 to display electronic content such as interfaces shown in FIGS. 4 and 5. For example, the computer display 1130 can be an in-store interactive display 114 (e.g., a large in-store screen) used to display electronic content such as product images and information tailored to a visitor based on that visitor's current company in the store. Also, for example, computer display 1130 can be used to display the user interfaces shown in FIGS. 4 and 5. As shown in FIG. 11, computer system 1100 can also include an input device 1132 and a camera 1134. In an embodiment, camera 1134 can be a camera associated with display 1130. For instance, camera 1134 can be a camera integrated with display 1130 or mounted on top of display 1130. Camera 1134 can be a webcam or any other suitable video camera capable of capturing video frames of people viewing display 1130. For example, camera 120 shown in FIG. 1 can be implemented as camera 1134.

In the non-limiting example shown in FIG. 11, secondary memory 1110 includes an audience management platform 1115, and visitor and group modules 1116. Audience management platform 1115 and visitor and group modules 1116 can be implemented as computer programs stored in secondary memory 1110.

According to one example, audience management platform 1115 can be implemented using Adobe® Audience Manager. By using audience management platform 1115, a retailer, an administrator 118, and/or a marketing analyst 826 can manage content for a store's website or the store's advertising campaign. Audience management platform 1115 can be used to select and modify product content, and can include an administrator interface for selecting product images and editing product descriptions and offers.

Visitor and group modules 1116 can include the visitor and group identification modules 202 and 204 as shown in the example of FIG. 2, discussed above. The visitor and group modules 1116 can further include the context information module 206 and use data stored in the visitor profiles 208 and group profiles 210 shown in FIG. 2.

Embodiments of the invention also may be directed to computer program products comprising software stored on any computer useable medium. Such software, when executed in one or more data processing device, causes a data processing device(s) to operate as described herein. Embodiments of the invention employ any computer useable or readable medium. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, and optical storage devices, MEMS, nanotechnological storage device, or another storage device), and communication mediums (e.g., wired and wireless communications networks, local area networks, wide area networks, intranets, or another communication medium).

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art. Indeed, the methods and systems described herein may be embodied in a variety of other forms; furthermore, various omissions, substitutions and changes in the form of the methods and systems described herein may be made without departing from the spirit of the present disclosure. The accompanying claims and their equivalents are intended to cover such forms or modifications as would fall within the scope and spirit of the present disclosure.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing system from a general-purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example.

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Similarly, the use of "based at least in part on" is meant to be open and inclusive, in that a process, step, calculation, or other action "based at least in part on" one or more recited conditions or values may, in practice, be based on additional conditions or values beyond those recited. Headings, lists, and numbering included herein are for ease of explanation only and are not meant to be limiting.

The various features and processes described above may be used independently of one another, or may be combined in various ways. All possible combinations and sub-combinations are intended to fall within the scope of the present disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed examples. Similarly, the example systems and components described herein may be configured differently than described. For example, elements may be added to, removed from, or rearranged compared to the disclosed examples.

What is claimed is:

1. A computer-implemented method for selecting content to be delivered to a visitor to a real-world venue, the method comprising:
    tracking, by a processing device, physical actions of the visitor at the real-world venue through communicating with a portable device associated with the visitor and based on data communicated between the portable device and one or more sensors installed in the real-world venue;
    identifying, by the processing device, the visitor based at least in part on the tracked physical actions and a profile including previously collected visitor information associated with the real-world venue, wherein the profile of the visitor comprises an identifier of the visitor, a user segment associated with the visitor, and an identifier of each member of a group associated with the visitor for the user segment;
    determining members of the group associated with the visitor based on the profile of the visitor;
    determining, by the processing device, that one or more of the members of the group are present at the real-world venue with the identified visitor, the determining based at least in part on the previously collected visitor information and non-visual data collected by the one or more sensors in the real-world venue;
    based on determining that the visitor is present at the real-world venue with one or more members of the group, selecting, according to the user segment, content for the identified visitor that is related to an item that the visitor has interacted with in prior visits of the visitor to the real-world venue with the one or more members of the group; and
    pushing the content to the portable device associated with the visitor while the visitor is present at the real-world venue, wherein the pushed content activates the portable device to cause the content to display on the portable device.

2. The method of claim 1, wherein the one or more sensors comprise a beacon, a Radio Frequency Identification (RFID) device, or a Near Field Communication (NFC) device, wherein tracking the physical actions comprises determining a visitor location using the one or more sensors to send or receive signals with the portable device associated with the visitor, and wherein a location of the one or more sensors when the signals are sent or received is used to determine the visitor location.

3. The method of claim 1, wherein the real-world venue is one of a brick-and-mortar store, a motor vehicle, a public transit station, an aircraft, a home, an information kiosk, a theater, and a sports venue.

4. The method of claim 1, wherein the group is one or more of a couple, a group of friends, a group of co-workers, a family, or a household.

5. The method of claim 1, wherein a member of the group associated with the visitor is determined by:
    determining, based on the previously collected visitor information, that the visitor and the member of the group visited the real-world venue together more than a threshold number of times in a duration.

6. The method of claim 5, wherein determining that the visitor and the member of the group visited the real-world venue together more than the threshold number of times in the duration comprises:
   determining that the visitor and the member of the group entered or exited the real-world venue at substantially the same time more than the threshold number of times.

7. The method of claim 1, wherein a member of the group associated with the visitor is determined based at least in part on collected Global Positioning System (GPS) coordinates of the visitor and the member of the group.

8. The method of claim 1, wherein tracking the physical actions comprises identifying that the visitor entered the real-world venue with a particular member of the group based on data collected by a beacon in the real-world venue.

9. The method of claim 1, wherein a member of the group associated with the visitor is determined based at least in part on determining that the visitor and the member of the group used a common payment means at the real-world venue more than a threshold number of times in a duration.

10. The method of claim 1, wherein identifying the visitor is further based on one or more of:
   a visitor image from a camera;
   a visitor identifier from the portable device of the visitor;
   a visitor activity determined based on interpreting images from a camera;
   information from an Internet of Things (IoT)-type sensor;
   information from a beacon; or
   information from a Radio Frequency Identification (RFID) chip.

11. The method of claim 1, wherein the previously collected visitor information comprises one or more of:
   images from one or more cameras;
   information from one or more IoT-type sensors;
   information from one or more beacons; or
   information from one or more RFID chips.

12. A system comprising:
   a processor;
   a display device;
   a camera; and
   a memory having instructions stored thereon, that, if executed by the processor, cause the processor to perform operations comprising:
      tracking physical actions of a visitor at a real-world venue through communicating with a portable device associated with the visitor and based on data communicated between the portable device and one or more sensors installed in the real-world venue;
      identifying the visitor based at least in part on the tracked physical actions and a profile including previously collected visitor information associated with the real-world venue, wherein the profile of the visitor comprises an identifier of the visitor, a user segment associated with the visitor, and an identifier of each member of a group associated with the visitor for the user segment;
      determining members of the group associated with the visitor based on the profile of the visitor;
      determining that one or more of the members of the group are present at the real-world venue with the identified visitor, the determining based at least in part on the previously collected visitor information and non-visual data collected by the one or more sensors in the real-world venue;
      based on determining that the visitor is present at the real-world venue with one or more members of the group, selecting, according to the user segment, content for the identified visitor that is related to an item that the visitor has interacted with in prior visits of the visitor to the real-world venue with the one or more members of the group; and
      pushing the content to the portable device associated with the visitor while the visitor is present at the real-world venue, wherein the pushed content activates the portable device to cause the content to display on the portable device.

13. The system of claim 12, wherein a display device is present at the real-world venue, the operations further comprising displaying, on the display device, the selected content.

14. The system of claim 12, wherein tracking the physical actions comprises identifying that the visitor entered the real-world venue with a particular member of the group based on data collected by a beacon in the real-world venue.

15. The system of claim 12, wherein a member of the group associated with the visitor is determined by
   determining, based on the previously collected visitor information, that the visitor and the member of the group visited the real-world venue together more than a threshold number of times in a duration.

16. The system of claim 12, wherein a member of the group associated with the visitor is determined based at least in part on collected Global Positioning System (GPS) coordinates of the visitor and at least one member of the group.

17. A non-transitory computer readable storage medium having executable instructions stored thereon, that, when executed by a computing device in a real-world venue, cause the computing device to perform operations comprising:
   tracking physical actions of a visitor at a real-world venue through communicating with a portable device associated with the visitor and based on data communicated between the portable device and one or more sensors installed in the real-world venue;
   identifying the visitor based at least in part on the tracked physical actions and a profile including previously collected visitor information associated with the real-world venue, wherein the profile of the visitor comprises an identifier of the visitor, a user segment associated with the visitor, and an identifier of each member of a group associated with the visitor for the user segment;
   determining members of the group associated with the visitor based on the profile of the visitor;
   determining that one or more of the members of the group are present at the real-world venue with the identified visitor, the determining based at least in part on the previously collected visitor information and non-visual data collected by the one or more sensors in the real-world venue;
   based on determining that the visitor is present at the real-world venue with one or more members of the group, selecting, according to the user segment, content for the identified visitor that is related to an item that the visitor has interacted with in prior visits of the visitor to the real-world venue with the one or more members of the group; and
   pushing the content to the portable device associated with the visitor while the visitor is present at the real-world venue, wherein the pushed content activates the portable device to cause the content to display on the portable device.

18. The non-transitory computer readable storage medium of claim 17, wherein tracking the physical actions comprises identifying the visitor entered the real-world venue with a particular member of the group based on data collected by a beacon in the real-world venue.

19. The non-transitory computer readable storage medium of claim 17, wherein a member of the group associated with the visitor is determined by determining, based on the previously collected visitor information, that the visitor and the member of the group visited the real-world venue together more than a threshold number of times in a duration.

20. The non-transitory computer readable storage medium of claim 17, wherein the previously collected visitor information comprises one or more of:
- images from one or more cameras;
- information from one or more IoT-type sensors;
- information from one or more beacons; or
- information from one or more Radio Frequency Identification (RFID) chips.

\* \* \* \* \*